(12) United States Patent
Goldberg et al.

(10) Patent No.: US 9,450,849 B1
(45) Date of Patent: Sep. 20, 2016

(54) TRACE BACKTRACKING IN DISTRIBUTED SYSTEMS

(71) Applicant: Amazon Technologies, Inc., Reno, NV (US)

(72) Inventors: Anton Vladilenovich Goldberg, Bellevue, WA (US); Brandon William Porter, Yarrow Point, WA (US); Aram Grigoryan, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 381 days.

(21) Appl. No.: 13/950,068

(22) Filed: Jul. 24, 2013

(51) Int. Cl.
*H04L 12/26* (2006.01)
(52) U.S. Cl.
CPC .................. *H04L 43/0876* (2013.01)
(58) Field of Classification Search
CPC ........... G06F 11/3466; G06F 11/3495; G06F 11/3034; G06F 11/3636
See application file for complete search history.

(56) References Cited

U.S. PATENT DOCUMENTS

| | | | |
|---|---|---|---|
| 5,809,121 A | 9/1998 | Elliott et al. | |
| 5,930,344 A | 7/1999 | Relyea et al. | |
| 6,651,243 B1 * | 11/2003 | Berry et al. | 717/130 |
| 7,058,928 B2 * | 6/2006 | Wygodny et al. | 717/128 |
| 7,209,548 B2 | 4/2007 | Ethier et al. | |
| 7,496,799 B2 | 2/2009 | Prang et al. | |
| 2008/0031145 A1 * | 2/2008 | Ethier et al. | 370/248 |
| 2009/0049429 A1 * | 2/2009 | Greifeneder et al. | 717/128 |
| 2014/0101643 A1 | 4/2014 | Inoue | |

OTHER PUBLICATIONS

U.S. Appl. No. 13/950,068, filed Jul. 24, 2013, Anton Vladilenovich Goldberg.
U.S. Appl. No. 14/133,545, filed Dec. 18, 2012, Jon Arron McClintock.
U.S. Appl. No. 14/014,042, filed Aug. 29, 2013, Jon Arron Mcclintock et al.
Rodrigo Fonseca, George Porter, Randy H. Katz, Scott Shenker, and Ion Stoica, "X-Trace: A Pervasive Network Tracing Framework," 4th USENIX Symposium on Networked Systems Design & Implementation (NSDI'07), Apr. 2007. pp. 1-14.
Benjamin H. Sigelman, Luiz Andre Barroso, Mike Burrows, Pat Stephenson, Manoj Plakal, Donald Beaver, Saul Jaspan, and Chandan Shanbhag, "Dapper, a Large-Scale Distributed Systems Tracing Infrastructure," Google Technical Report dapper-2010-1, Apr. 2010.pp. 1-14.
U.S. Appl. No. 13/950,070, filed Jul. 24, 2013, Anton Vladilenovich Goldberg.

* cited by examiner

*Primary Examiner* — Frantz Jean
*Assistant Examiner* — Anthony Rotolo
(74) *Attorney, Agent, or Firm* — Robert C. Kowert; Meyertons, Hood, Kivlin, Kowert & Goetzel, P.C.

(57) ABSTRACT

Methods and systems for trace backtracking are disclosed. In response to receiving a request from an upstream component at a downstream component, a trace is initiated at the downstream component. A response to the request is sent from the downstream component to the upstream component. The response comprises trace metadata. Trace data is generated at the upstream component in response to receiving the trace metadata at the upstream component. The trace data describes an interaction between the upstream component and the downstream component. A call graph is generated based on the trace data. The call graph comprises a call path between the upstream component and the downstream component.

22 Claims, 17 Drawing Sheets

TRACE BACKTRACKING IN DISTRIBUTED SYSTEMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

In order to monitor the performance or behavior of such a distributed system, the flow of data through the system may be traced. The information resulting from the trace may be analyzed, and actions to improve the performance or behavior may be taken in response to the analysis. However, for sufficiently large and complex systems, the computational, network, and/or storage resources required to trace every transaction may far exceed an acceptable measure.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for providing trace deduplication are described. Using the systems and methods described herein, interactions between services (e.g., call paths) in a distributed system may be monitored. Using the interaction data, a trace representing a particular route taken through multiple services to satisfy a particular request may be determined. The trace may be compared to a set of stored traces. If the trace does not match one of the stored traces, the trace may be considered unique and may be added to the stored traces. However, if the trace does match one of the stored traces, the trace may be discarded, and statistics (e.g., latency, hit count, etc.) for the matching stored trace may be updated to reflect the inclusion of the discarded trace. By deduplicating and aggregating traces in this manner, storage requirements for traces may be reduced significantly.

Various embodiments of methods and systems for providing trace backtracking are described. Using the systems and methods described herein, traces may be initiated by a downstream service and propagated upstream and potentially downstream as well. Trace data published by various services after the initiation of the trace may be used to build a call graph. By backtracking traces in this manner, traces may be initiated not necessarily for every transaction but instead for a limited number of transactions, including transactions which merit greater scrutiny than usual.

Trace Deduplication

Figure 1:
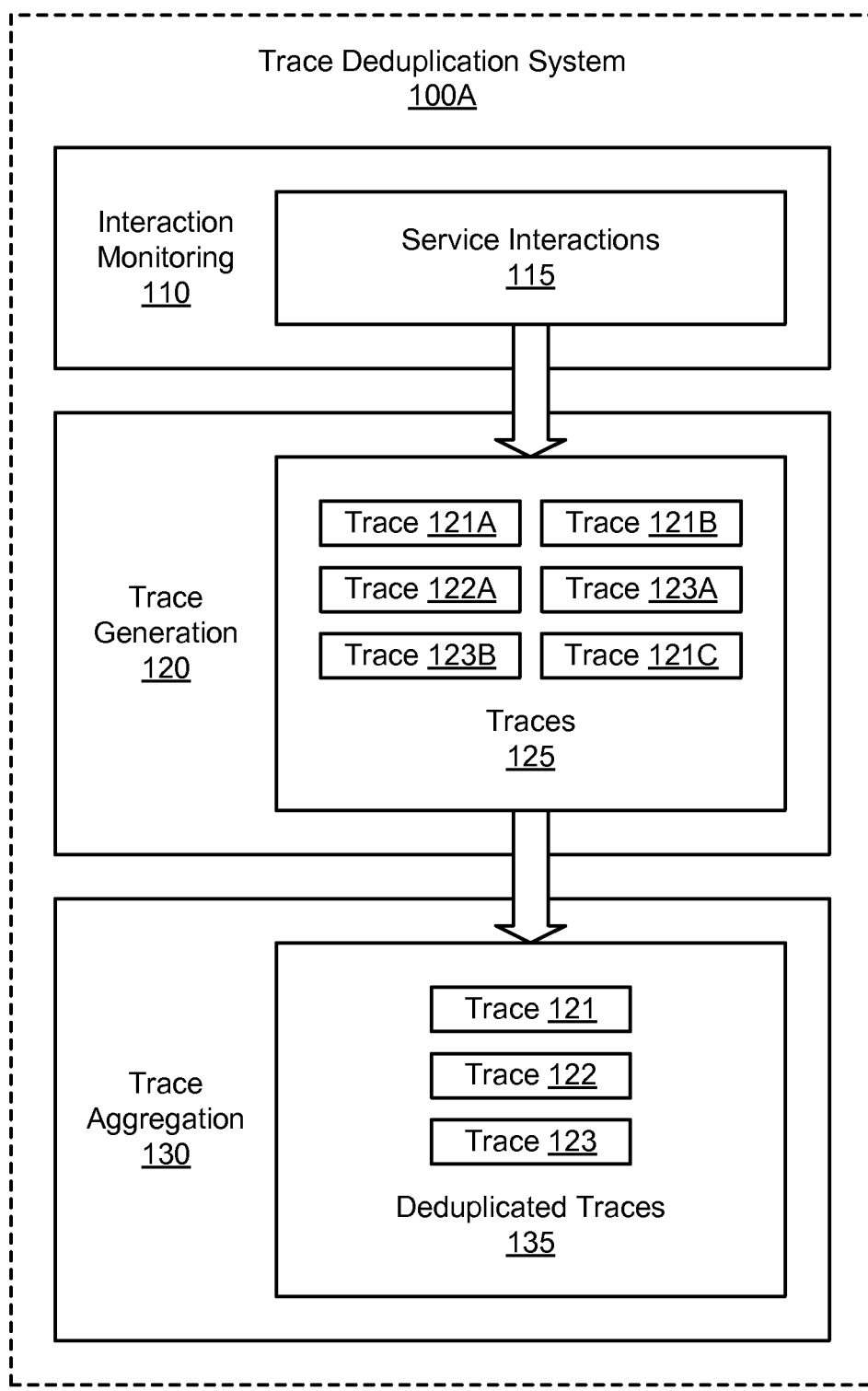
FIG. 1 illustrates an example system environment for trace deduplication, according to some embodiments.

FIG. 1 illustrates an example system environment for trace deduplication, according to one embodiment. The example system environment may include a trace deduplication system 100A. The trace deduplication system 100A may include a plurality of components for monitoring interactions between services and efficiently storing trace information based on the monitored interactions. For example, the trace deduplication system 100A may include interaction monitoring functionality 110, trace generation functionality 120, and trace aggregation functionality 130.

Figure 15:
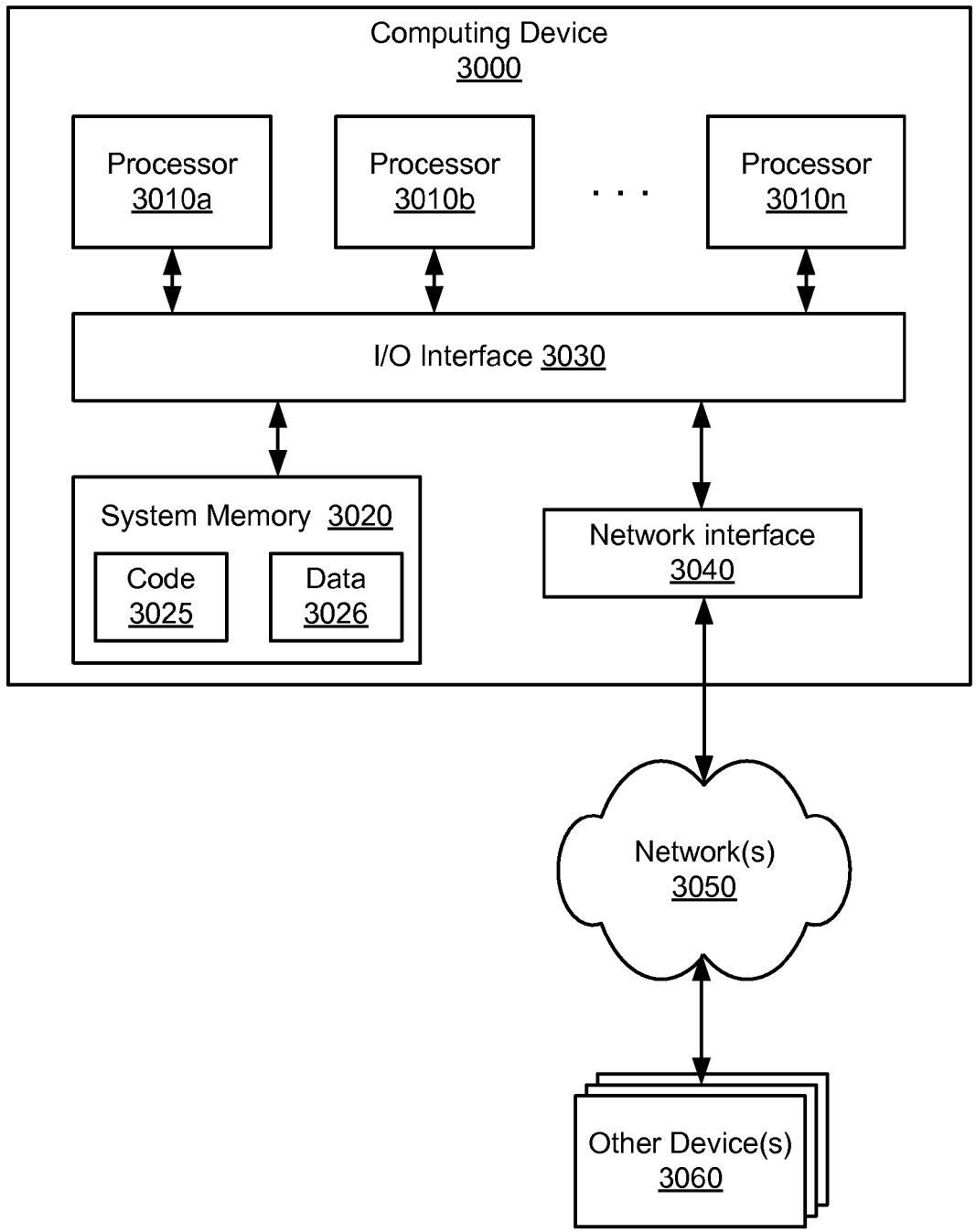
FIG. 15 illustrates an example of a computing device that may be used in some embodiments.

The trace deduplication system 100A may comprise one or more computing devices, any of which may be implemented by the example computing device 3000 illustrated in FIG. 15. In various embodiments, the functionality of the different services, components, and/or modules of the trace deduplication system 100A (e.g., interaction monitoring functionality 110, trace generation functionality 120, and trace aggregation functionality 130) may be provided by the same computing device or by different computing devices. If any of the various components are implemented using different computing devices, then the respective computing devices may be communicatively coupled, e.g., via a network. Each of the interaction monitoring functionality 110, trace generation functionality 120, and trace aggregation functionality 130 may represent any combination of software and hardware usable to perform their respective functions, as discussed as follows.

The interaction monitoring functionality 110 may monitor or track interactions 115 between services or components of services in a service-oriented system, such as a system structured according to a service-oriented architecture (SOA). A service-oriented architecture may include multiple services configured to communicate with each other (e.g., through message passing) to carry out various tasks, such as business process functions. The services may be distributed across multiple computing instances and/or multiple subsystems which are connected, e.g., via one or more networks. In some embodiments, such services may be loosely coupled in order to minimize (or in some cases eliminate) interdependencies among services. This modularity may enable services to be reused in order to build various applications through a process referred to as orchestration. A service may include one or more components that may also participate in the service-oriented architecture, e.g., by passing messages to other services or to other components within the same service.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes. The service interactions 115 may include requests (e.g., for services to be performed), responses to requests, and other suitable events.

The services and components described herein may include but are not limited to one or more of network-based services (e.g., a web service), applications, functions, objects, methods (e.g., objected-oriented methods), subroutines, or any other set of computer-executable instructions. In various embodiments, such services and components may communicate through any of a variety of communication protocols, including but not limited to the Simple Object Access Protocol (SOAP). In various embodiments, messages passed between services and components may include but are not limited to Extensible Markup Language (XML) messages or messages of any other markup language or format. In various embodiments, descriptions of operations offered by one or more of the services and components may include Web Service Description Language (WSDL) documents, which may in some cases be provided by a service broker accessible to the services and components. References to services herein may include components within services.

In one embodiment, the interaction monitoring functionality 110 may monitor interactions 115 between services in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To monitor the service interactions 115, lightweight instrumentation may be added to the services. The instrumentation (e.g., a reporting agent associated with each service) may collect and report data associated with each inbound request, outbound request, or other service interaction (e.g., a timer-based interaction) processed by a service. Further aspects of the service instrumentation, interaction monitoring functionality 110, and trace generation functionality 120 are discussed below with respect to FIGS. 9-14.

Turning back to FIG. 1, the trace generation functionality 120 may generate one or more traces 125 based on the collected service interactions 115. Each of the traces 125 may collect data indicative of service interactions involved in satisfying a particular initial request. In one embodiment, a particular trace may include data indicative of a route taken in satisfying a service request and/or a hierarchy of call pathways between services. The route may correspond to a set of call pathways between services. The call pathways may represent inbound service requests and outbound service requests relative to a particular service. To process a given received request, the system described herein may invoke one or more of the types of services described above. As used herein, an initial request may be referred to as the "root request." In various embodiments, the root request may but need not originate from a computer system outside of the service-oriented system described herein. In many embodiments, a root request may be processed by an initial service, which may then call one or more other services. Additionally, each of those services may also call one or more other services, and so on until the root request is completely fulfilled. Accordingly, the particular services called to fulfill a request may be represented as a call graph that specifies, for each particular service of multiple services called to fulfill the same root request, the service that called the particular service and any services called by the particular service. A call graph based on a trace may be a hierarchical data structure that include nodes representing the services and edges representing the interactions. In some cases, a call graph may be a deep and broad tree with multiple branches each representing a series of related service calls. The trace generation functionality 120 may use any suitable data and metadata to build the traces 125 and/or call graphs, such as request identifiers and metadata associated with services and their interactions. The request identifiers and metadata are discussed below with respect to FIGS. 9-14.

For clarity of description, various terms may be useful for describing elements of a trace or call graph. Note that the following terminology may only be applicable to services and requests of a given trace or call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

The generation of a particular trace may end, and the trace may be finalized, based on any suitable determination. In one embodiment, the trace may be finalized after a sufficient period of time has elapsed with no further service interactions made for any relevant service. In one embodiment, heuristics or other suitable rule sets may be used to determine a timeout for a lack of activity to satisfy a particular root request. The timeout may vary based on the nature of the root request. For example, a root request to generate a web page using a hierarchy of services may be expected to be completed within seconds; accordingly, the trace may be finalized within minutes. As another example, a root request to fulfill and ship a product order may be expected to be completed within days or weeks; accordingly, the trace may be finalized within weeks or even months.

The trace aggregation functionality 130 may store data corresponding to the traces 125 in an efficient manner, such as by filtering and discarding duplicative traces. Accordingly, the trace aggregation functionality 130 may determine and store a set of deduplicated traces 135. Any suitable techniques may be used to determine and store the deduplicated traces 135. In one embodiment, each of the traces 125 generated based on the monitored service interactions 115 may be compared to a set of stored traces. In one embodiment, each of the stored traces may represent a unique trace (e.g., a unique combination of services used in satisfying a root request), an example of a type of trace, or a trace that otherwise satisfies one or more of a set of predefined conditions. If one of the traces 125 does not match any of the stored traces, or if it is sufficiently dissimilar to all of the stored traces, then the trace may be added to the set of stored traces. However, if one of the traces 125 matches or is sufficiently similar to one of the stored traces, the trace may be discarded. In one embodiment, relevant statistics may be updated for the stored trace matching the discarded trace. The statistics may include, for example, a count of hits on the particular trace, an average latency, a percentile latency, and/or any other suitable statistics. For example, the hit count for the stored trace may be incremented for every matching trace that is discarded.

As shown in the example of FIG. 1, the generated traces 125 may include three instances 121A, 121B, 121C of a first trace, one instance 122A of a second trace, and two instances 123A, 123B of a third trace. Using the trace deduplication and aggregation techniques described herein, the duplicative traces may be discarded, and only one example of each trace may be stored in the deduplicated traces 135. Accordingly, as shown in the example of FIG. 1, the deduplicated traces 135 may store one example 121 of the first trace, one example 122 of the second trace, and one example 123 of the third trace. Any of the instances 121A, 121B, 121C of the first trace or a previously encountered instance of the first trace may be stored as the corresponding trace 121 in the deduplicated traces 135. The instance 122A of the second trace or a previously encountered instance of the second trace may be stored as the corresponding trace 122 in the deduplicated traces 135. Any of the instances 123A, 123B of the third trace or a previously encountered instance of the third trace may be stored as the corresponding trace 123 in the deduplicated traces 135. Typically, the first instance of a trace that is processed by the trace aggregation functionality 130 may be stored as the example of that particular trace.

In this manner, the storage requirements for traces may be significantly reduced. In some embodiments, the route taken to satisfy a root request may include tens or hundreds of services, each service interaction may include multiple events (e.g., an inbound request and response, an outbound request and response), and each event may generate trace data (e.g., 512 bytes). For a large distributed system, tracing all transactions may require multiple petabytes per hour of storage resources alone. Using the system and methods described herein for trace deduplication, the resources needed to trace events may be reduced significantly by eliminating the storage of duplicative traces. In one embodiment, trace deduplication may be combined with one or more additional techniques, such as trace backtracking and/or probabilistic sampling, to further reduce resource usage.

In one embodiment, all or nearly all of the service interactions 115 may be monitored using the techniques described herein. In one embodiment, only a percentage of the service interactions 115 may be monitored, and/or traces may be generated for only a percentage of traceable service requests. Any suitable technique may be used to identify which of the service interactions and/or root requests to trace. In one embodiment, probabilistic sampling techniques may be used to initiate traces for a certain percentage (e.g., 1%) of all traceable root requests.

Figure 2:
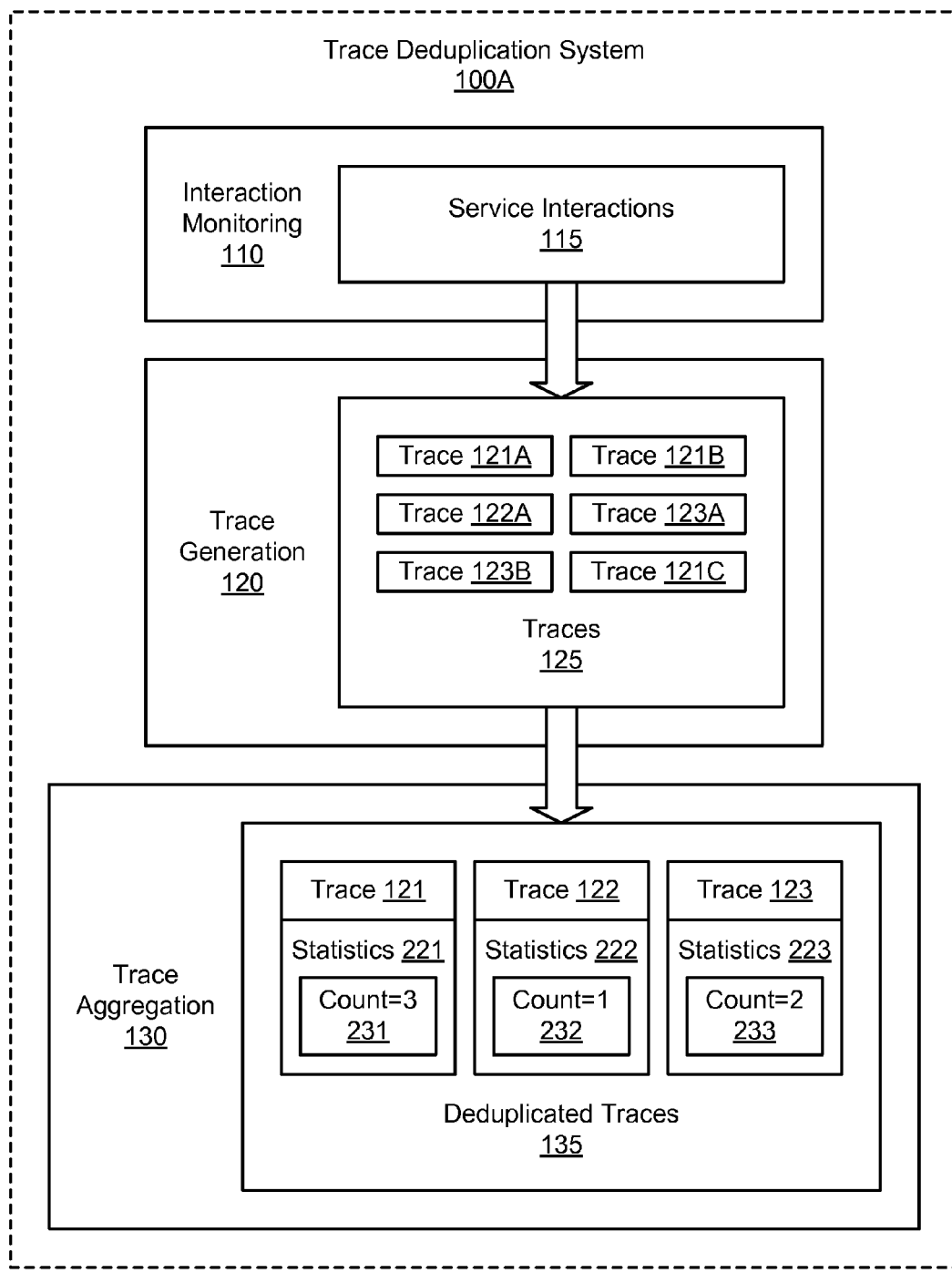
FIG. 2 illustrates further aspects of an example system environment for trace deduplication, according to some embodiments.

FIG. 2 illustrates further aspects of an example system environment for trace deduplication, according to some embodiments. As discussed above, the trace deduplication system 100A may include a plurality of components for monitoring interactions between services and efficiently storing trace information based on the monitored interactions, such as interaction monitoring functionality 110, trace generation functionality 120, and trace aggregation functionality 130. As shown again in the example of FIG. 2, the generated traces 125 may include three instances 121A, 121B, 121C of a first trace, one instance 122A of a second trace, and two instances 123A, 123B of a third trace. Using the trace deduplication and aggregation techniques described herein, the duplicative traces may be discarded, and only one example of each trace may be stored in the deduplicated traces 135. Accordingly, as shown in the example of FIG. 2, the deduplicated traces 135 may store one example 121 of the first trace, one example 122 of the second trace, and one example 123 of the third trace.

As discussed above, relevant statistics may be updated for the stored trace that matches a duplicative trace. The statistics may include, for example, a count of hits on the particular trace, an average latency, a percentile latency, and/or any other suitable statistics. The relevant statistics may also be initiated (e.g., with a hit count of one and any suitable latency statistics) for the first instance of a trace that is encountered. As shown in the example of FIG. 2, statistics 221 may be stored for the stored trace 121, statistics 222 may be stored for the stored trace 122, and statistics 223 may be stored for the stored trace 123. As shown in the example of FIG. 2, a hit count 231, 232, 233 may be stored with the corresponding set of statistics. If the only traces generated thus far were the six traces 121A, 121B, 121C, 122A, 123A, and 123B, then as shown in FIG. 2, the statistics 221 might indicate a hit count 231 of three, the statistics 222 might include a hit count 232 of one, and the statistics 223 might include a hit count 233 of two. The discarding of additional duplicative traces may result in the incrementing of the hit count (and updating of other statistics, e.g., latency statistics) for the corresponding stored trace 121, 122, or 123.

Figure 3:
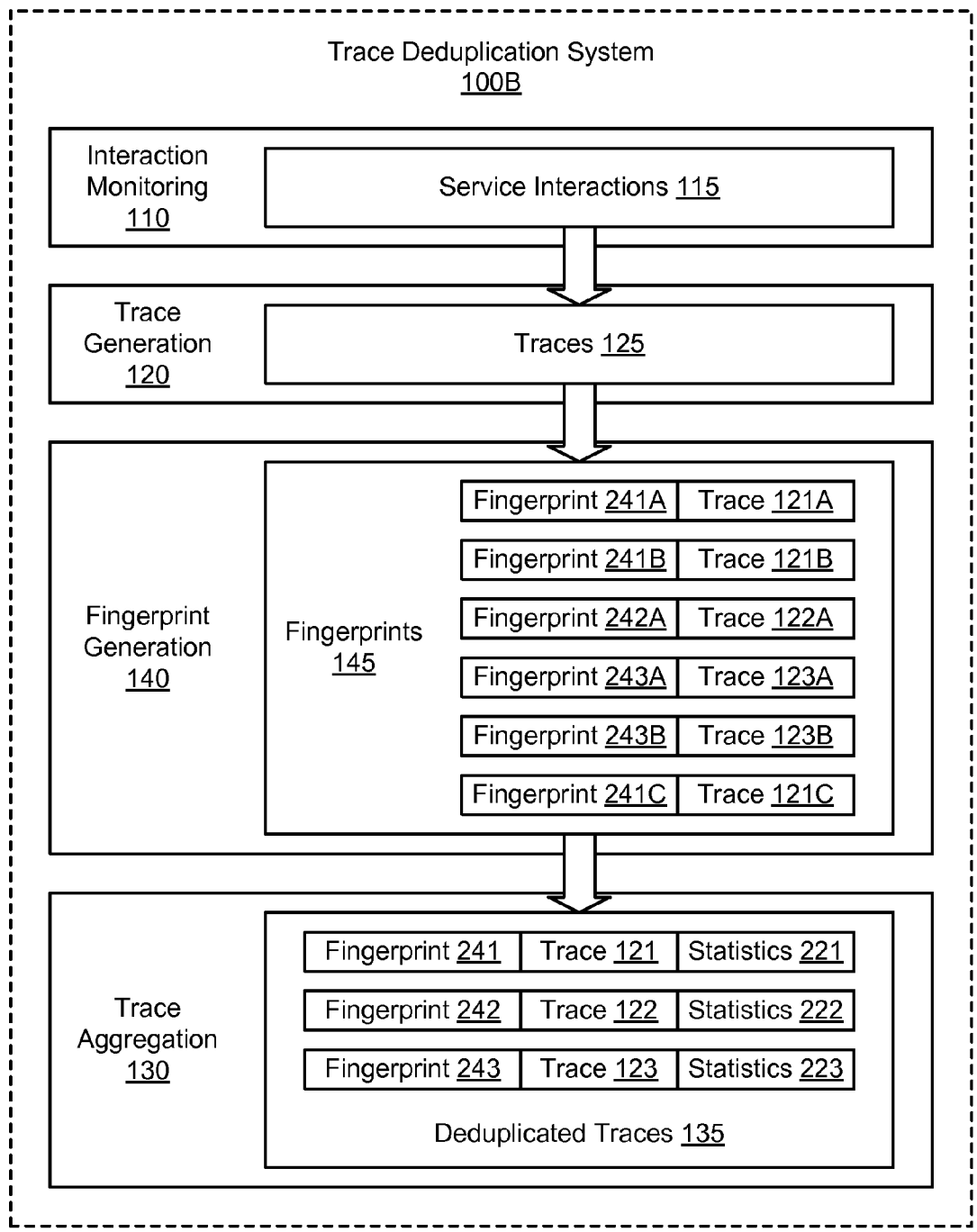
FIG. 3 illustrates further aspects of an example system environment for trace deduplication, according to some embodiments.

FIG. 3 illustrates further aspects of an example system environment for trace deduplication, according to some embodiments. The example system environment may include a trace deduplication system 100B. As discussed above with respect to FIGS. 1 and 2, the trace deduplication system 100B may include a plurality of components for monitoring interactions between services and efficiently storing trace information based on the monitored interactions. For example, the trace deduplication system 100B may include interaction monitoring functionality 110, trace generation functionality 120, fingerprint generation functionality 140, and trace aggregation functionality 130.

The trace deduplication system 100B may comprise one or more computing devices, any of which may be implemented by the example computing device 3000 illustrated in FIG. 15. In various embodiments, the functionality of the different services, components, and/or modules of the trace deduplication system 100B (e.g., interaction monitoring functionality 110, trace generation functionality 120, fingerprint generation functionality 140, and trace aggregation functionality 130) may be provided by the same computing device or by different computing devices. If any of the various components are implemented using different computing devices, then the respective computing devices may be communicatively coupled, e.g., via a network. Each of the interaction monitoring functionality 110, trace generation functionality 120, fingerprint generation functionality 140, and trace aggregation functionality 130 may represent any combination of software and hardware usable to perform their respective functions, as discussed as follows.

In one embodiment, each of the newly generated traces 125 may be compared to the stored traces 135 based on a fingerprint of each trace rather than the full trace. Accordingly, the fingerprint generation functionality 140 may generate a fingerprint to represent each of the traces 125. As shown in the example of FIG. 3, a fingerprint 241A may be generated for the trace 121A, a fingerprint 241B may be generated for the trace 121B, a fingerprint 242A may be generated for the trace 122A, a fingerprint 243A may be generated for the trace 123A, a fingerprint 243B may be generated for the trace 123B, and a fingerprint 241C may be generated for the trace 121C.

Any suitable technique may be used to generate fingerprints that represent the contents of traces. In one embodiment, the fingerprint may be generated by applying a hash function to aspects of the data in the trace. For example, the fingerprint may be a hash of an ordered list of names (optionally including a service name iteration) or other identifiers of the services encountered in the trace. In one embodiment, the hash function used to generate the fingerprints may have a low collision rate such that comparisons of fingerprints are unlikely to result in false positives or false negatives for the underlying traces. The fingerprint may be smaller in size (e.g., 16 bytes or 32 bytes) than the trace itself (e.g., 512 bytes for each event for each service). If the fingerprint is significantly smaller in size than the corresponding trace, then the computational and memory resources used in comparing a new trace to multiple stored traces may be significantly reduced.

As shown in FIG. 3, each of the stored traces 135 may also be associated with a fingerprint. For example, trace 121 may be stored with a corresponding fingerprint 241, trace 122 may be stored with a corresponding fingerprint 242, and trace 123 may be stored with a corresponding fingerprint 243. As also shown in the example, the generated traces 125 may include three instances 121A, 121B, 121C of a first trace, one instance 122A of a second trace, and two instances 123A, 123B of a third trace. In one embodiment, the fingerprints 241A, 241B, 241C, and 241 may be essentially identical because the underlying traces are identical in some key respect (e.g., each of the underlying traces has the same set of services). Similarly, the fingerprints 243A, 243B, and 243 may be essentially identical for the same reason. Using the trace deduplication and aggregation techniques described herein, the duplicative traces may be discarded based on their respective fingerprints matching those of the stored traces 135. In one embodiment, only one example of each trace and its associated fingerprint may be stored in the deduplicated traces 135. Accordingly, as shown in the example of FIG. 3, the deduplicated traces 135 may store one example 121 of the first trace, one example 122 of the second trace, and one example 123 of the third trace.

In one embodiment, individual ones of the fingerprints 145 may be generated on various computer systems, such as hosts executing different services in the service-oriented architecture. The fingerprints 145 may be collected at one or more central locations (e.g., central computer systems), where the comparison operation may be performed. Accordingly, the comparison operation may be performed periodically for a batch of fingerprints collected from different fingerprinting systems at one or more central computer system(s). The central computer system(s) may differ from the systems that generate the fingerprints.

Figure 4:
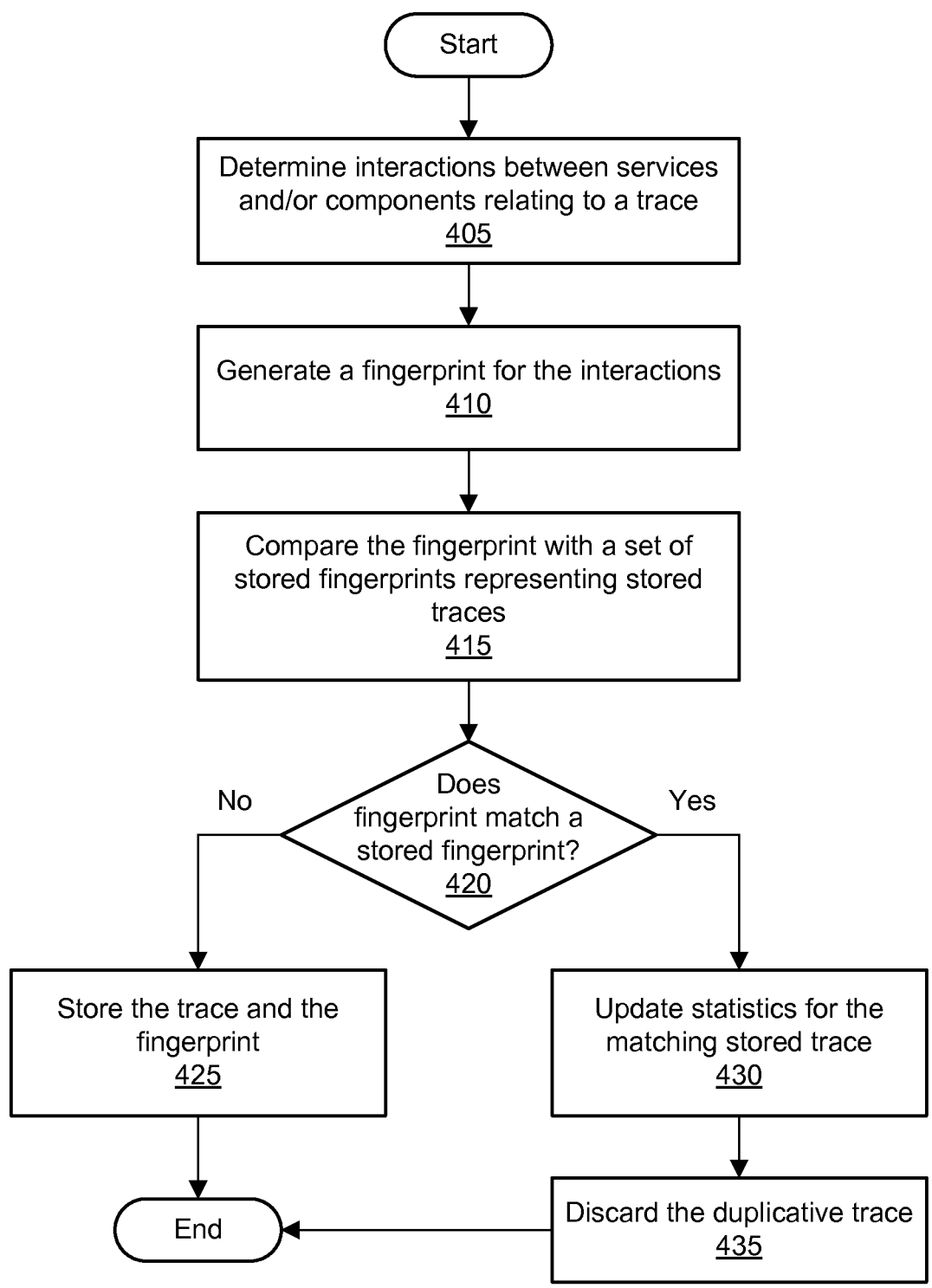
FIG. 4 is a flowchart illustrating a method for implementing trace deduplication, according to some embodiments.

FIG. 4 is a flowchart illustrating a method for implementing trace deduplication, according to some embodiments. As shown in 405, interactions between services that relate to a trace may be determined. The interactions between the services may be related, e.g., the interactions occurred to satisfy an initial request such as a root request. The interactions may also include interactions between components of the same service and/or of different services. The interactions may be detected through interaction monitoring 110 as described above, e.g., with respect to FIG. 1. Interactions may be assigned to a particular trace based on a common trace identifier found in the interactions (e.g., requests and/or responses). The trace identifier may correspond to an identifier found in the root request or in any other interaction that initiates the trace. The trace may be finalized at any appropriate point in time, e.g., after a predetermined amount of time has passed with no further change in the trace.

As shown in 410, a fingerprint may be generated for the interactions. As described above with respect to FIG. 3, the fingerprint may include data that represents the interactions and/or the corresponding trace in a significantly smaller size. For example, the fingerprint may be generated as a hash of data associated with the interactions and/or the trace, such as a hash of an ordered list of the names or other identifiers of the services in the trace. The other identifiers may include any suitable reference that identifies a particular service within an appropriate context. Typically, the identifiers of a service may include one or more alphanumeric identifiers such as a name, an iteration identifier, a version number, etc.

As shown in 415, the fingerprint for the current trace may be compared to individual ones of a set of stored fingerprints. Each of the stored fingerprints may correspond to a stored trace in a set of deduplicated traces. The comparison operation may attempt to find a match for the current fingerprint among the stored fingerprints. As long as a match is not found, the comparison operation may proceed until the current fingerprint has been compared to each of the stored fingerprints. In one embodiment, however, the comparison operation may stop if a match with a stored fingerprint is found. The comparison operation may use any suitable operator(s) to identify matches. In one embodiment, the comparison operation may seek to identify stored fingerprints that are identical or equal to the current fingerprint. In one embodiment, the comparison operation may seek to identify stored fingerprints that may not be identical or equal but are sufficiently similar to the current fingerprint to justify discarding the current trace. Any suitable heuristics may be used to determine such a similarity between fingerprints or between sets of interactions.

As shown in 420, a determination may be made as to whether the current fingerprint matches at least one of the stored fingerprints based on the comparison operation. In one embodiment, the operation shown in 420 may be combined with the operation shown in 415. If the current fingerprint does not match any of the stored fingerprints (e.g., if the current fingerprint is not sufficiently similar to any of the stored fingerprints), then as shown in 425, the current trace and its fingerprint may be added to the set of stored and deduplicated traces. However, if the current fingerprint does match at least one of the stored fingerprints, then as shown in 430, one or more statistics (e.g., latency, hit count, etc.) for the matching stored trace may be updated. Furthermore, as shown in 435, the duplicative trace may be discarded from memory. The operations shown in 430 and 435 may be performed in a different order than shown or substantially simultaneously.

Figure 5:
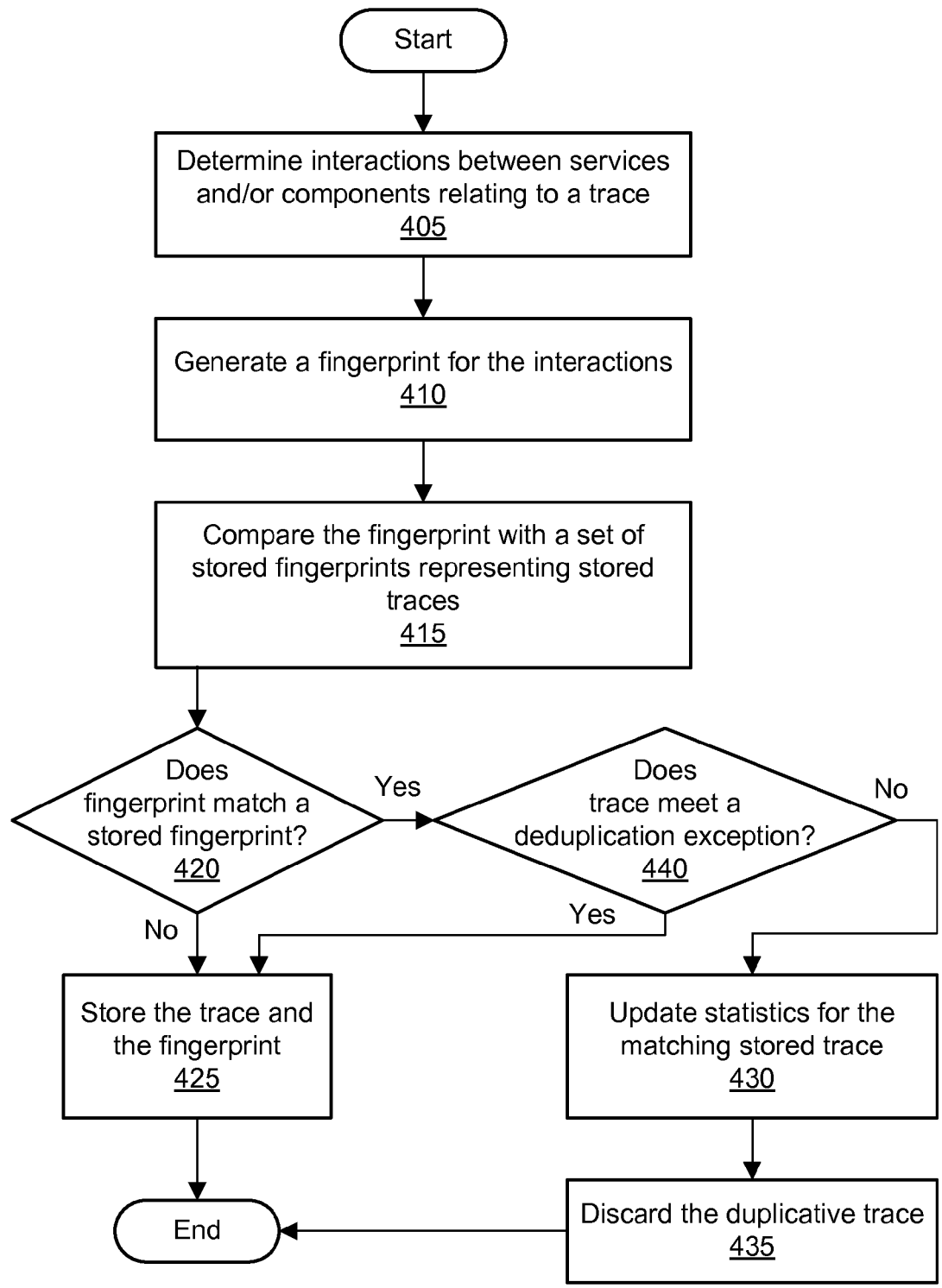
FIG. 5 is a flowchart illustrating a method for implementing trace deduplication, according to some embodiments.

In one embodiment, certain traces may be kept even if they match stored traces. FIG. 5 is a flowchart illustrating a method for implementing trace deduplication, according to some embodiments. As shown in 405, interactions between services that relate to a trace may be determined. The interactions between the services may be related, e.g., the interactions occurred to satisfy an initial request such as a root request. The interactions may also include interactions between components of the same service and/or of different services. The interactions may be detected through interaction monitoring 110 as described above, e.g., with respect to FIG. 1. Interactions may be assigned to a particular trace based on a common trace identifier found in the interactions (e.g., requests and/or responses). The trace identifier may correspond to an identifier found in the root request or in any other interaction that initiates the trace. The trace may be finalized at any appropriate point in time, e.g., after a predetermined amount of time has passed with no further change in the trace.

As shown in 410, a fingerprint may be generated for the current interactions. As described above with respect to FIG. 3, the fingerprint may include data that represents the interactions and/or the corresponding trace in a significantly smaller size. For example, the fingerprint may be generated as a hash of data associated with the interactions and/or the trace, such as a hash of an ordered list of the names or other identifiers of the services in the trace. The other identifiers may include any suitable reference that identifies a particular service within an appropriate context. Typically, the identifiers of a service may include one or more alphanumeric identifiers such as a name, an iteration identifier, a version number, etc.

As shown in 415, the fingerprint for the current trace may be compared to individual ones of a set of stored fingerprints. Each of the stored fingerprints may correspond to a stored trace in a set of deduplicated traces. The comparison operation may attempt to find a match for the current fingerprint among the stored fingerprints. As long as a match is not found, the comparison operation may proceed until the current fingerprint has been compared to each of the stored fingerprints. In one embodiment, however, the comparison operation may stop if a match with a stored fingerprint is found. The comparison operation may use any suitable operator(s) to identify matches. In one embodiment, the comparison operation may seek to identify stored fingerprints that are identical or equal to the current fingerprint. In one embodiment, the comparison operation may seek to identify stored fingerprints that may not be identical or equal but are sufficiently similar to the current fingerprint to justify discarding the current trace. Any suitable heuristics may be used to determine such a similarity between fingerprints or between sets of interactions.

As shown in 420, a determination may be made as to whether the current fingerprint matches at least one of the stored fingerprints based on the comparison operation. In one embodiment, the operation shown in 420 may be combined with the operation shown in 415. If the current fingerprint does not match any of the stored fingerprints (e.g., if the current fingerprint is not sufficiently similar to any of the stored fingerprints), then as shown in 425, the current trace and its fingerprint may be added to the set of stored and deduplicated traces. However, if the current fingerprint does match at least one of the stored fingerprints, then as shown in 440, it may be determined whether the current trace meets at least one deduplication exception.

In one embodiment, the deduplication exceptions may be a predefined set of exceptions that seek to preserve some traces in the set of stored traces regardless of whether the traces duplicate any of the stored traces in some aspect (e.g., in the list of service names in the trace). In one embodiment, at least a portion of the deduplication exceptions may be implemented as patterns (e.g., for data types, service names, metadata elements, etc.) that may be matched against elements of a trace. The deduplication exceptions may be based on the contents of requests or responses in the service interactions, the presence of an error condition in one of the services, the presence of a particular service in the trace, the content of any metadata associated with a trace, the content of any data passed in the service interactions, and/or any other suitable conditions. Generally speaking, the deduplication exceptions may seek to preserve traces in which something unusual happened or traces which may otherwise merit greater scrutiny than usual. For example, a deduplication exception may be satisfied if the trace was generated in a test environment, if the trace involves an uncommonly used service, if the trace involves sensitive data, if latency for communication between services exceeded a threshold, if one service called another service located in a different continent, etc. In one embodiment, at least some of the deduplication exceptions may be generated based on machine learning techniques.

If the current trace meets at least one deduplication exception, then even though the current trace may match a stored trace, the trace and its fingerprint may be stored as shown in 425. If the current trace matches one of the stored traces and does not meet any of the deduplication exceptions, then as shown in 430, one or more statistics (e.g., latency, hit count, etc.) for the matching stored trace may be updated. Furthermore, as shown in 435, the duplicative trace may be discarded from memory. The operations shown in 430 and 435 may be performed in a different order than shown or substantially simultaneously.

Trace Backtracking

Figure 6:
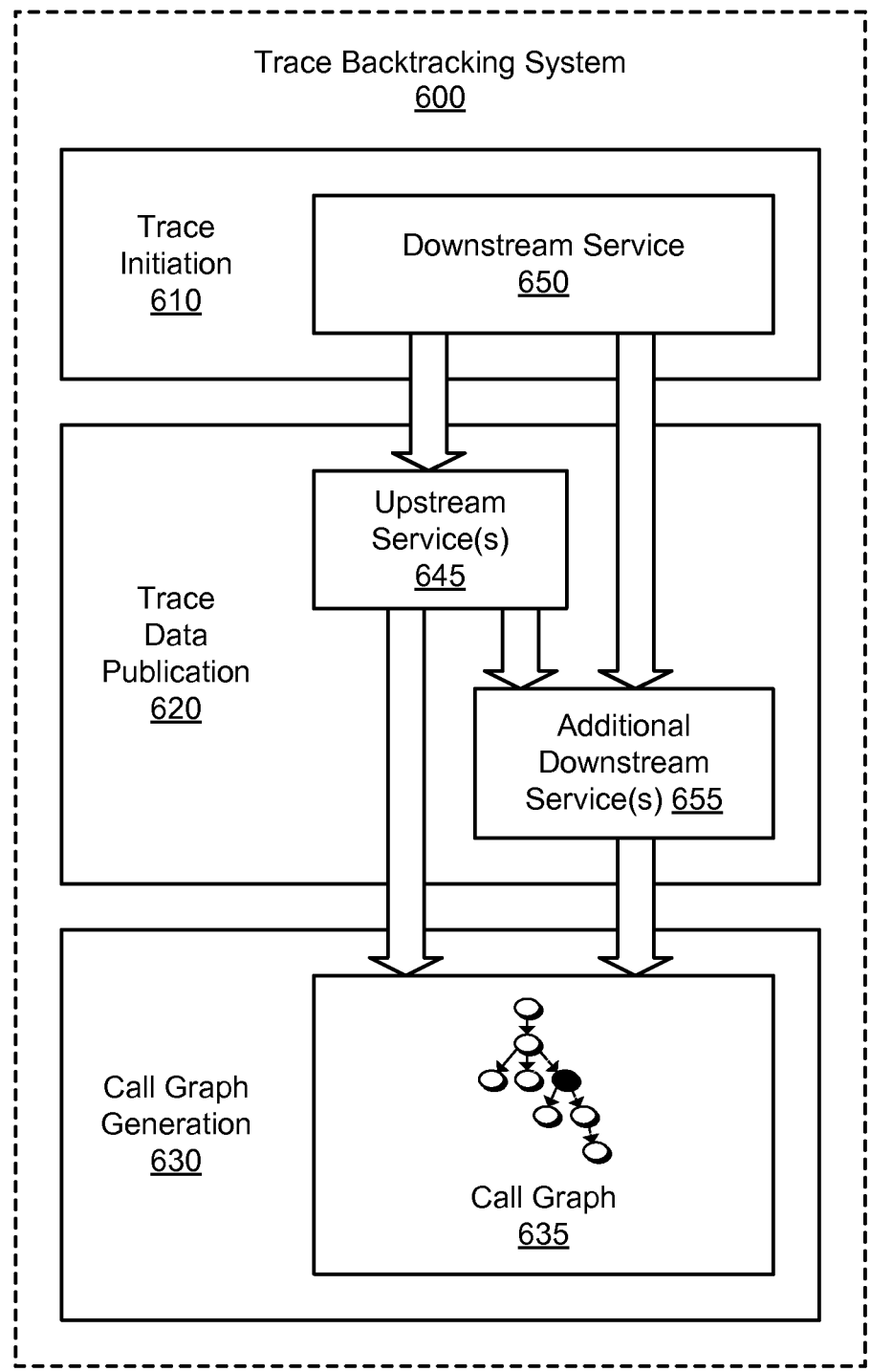
FIG. 6 illustrates an example system environment for trace backtracking, according to some embodiments.

FIG. 6 illustrates an example system environment for trace backtracking, according to some embodiments. The example system environment may include a trace backtracking system 600. The trace backtracking system 600 may include a plurality of functionalities for initiating traces at downstream services and propagating traces to upstream services (and potentially to additional downstream services). For example, the trace backtracking system 600 may include trace initiation functionality 610, trace data publication functionality 620, and call graph generation functionality 630.

The trace backtracking system 600 may comprise one or more computing devices, any of which may be implemented by the example computing device 3000 illustrated in FIG. 15. In various embodiments, the functionality of the different services, components, and/or modules of the trace backtracking system 600 (e.g., trace initiation functionality 610, trace data publication functionality 620, and call graph generation functionality 630) may be provided by the same computing device or by different computing devices. If any of the various components are implemented using different computing devices, then the respective computing devices may be communicatively coupled, e.g., via a network. Each of the trace initiation functionality 610, trace data publication functionality 620, and call graph generation functionality 630 may represent any combination of software and hardware usable to perform their respective functions, as discussed as follows.

The trace initiation functionality 610 may initiate a trace of interactions between services or components of services in a service-oriented system, such as a system structured according to a service-oriented architecture (SOA). A service-oriented architecture may include multiple services configured to communicate with each other (e.g., through message passing) to carry out various tasks, such as business process functions. The services may be distributed across multiple computing instances and/or multiple subsystems which are connected, e.g., via one or more networks. In some embodiments, such services may be loosely coupled in order to minimize (or in some cases eliminate) interdependencies among services. This modularity may enable services to be reused in order to build various applications through a process referred to as orchestration. A service may include one or more components that may also participate in the service-oriented architecture, e.g., by passing messages to other services or to other components within the same service.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes. The service interactions may include requests (e.g., for services to be performed), responses to requests, and other suitable events.

The services and components described herein may include but are not limited to one or more of network-based services (e.g., a web service), applications, functions, objects, methods (e.g., objected-oriented methods), subroutines, or any other set of computer-executable instructions. In various embodiments, such services and components may communicate through any of a variety of communication protocols, including but not limited to the Simple Object Access Protocol (SOAP). In various embodiments, messages passed between services and components may include but are not limited to Extensible Markup Language (XML) messages or messages of any other markup language or format. In various embodiments, descriptions of operations offered by one or more of the services and components may include Web Service Description Language (WSDL) documents, which may in some cases be provided by a service broker accessible to the services and components. References to services herein may include components within services.

In various embodiments, all of the services or many of the services in the service-oriented system may have the ability to initiate a trace. In one embodiment, a trace may be initiated by a downstream service 650. The downstream service 650 is a service that receives a request from one or more upstream services 645. The downstream service may optionally send additional requests to one or more additional downstream services 655.

In various embodiments, traces may be initiated on any number of different bases and for any number of reasons. In one embodiment, a service (e.g., downstream service 650) may initiate a trace if an error is encountered upon attempting to satisfy the inbound request from an upstream service. In one embodiment, a service (e.g., downstream service 650) may initiate a trace if one or more technical conditions are met. For example, a trace may be initiated if latency exceeds a threshold for communication with another service. In one embodiment, a service (e.g., downstream service 650) may initiate a trace if one or more business conditions are met. For example, a trace may be initiated if a sensitive business transaction has been initiated, such as the purchase of restricted goods. Generally speaking, a trace may be initiated as a result of the initiating service examining the form or content of the inbound request, the form or content of the data or metadata associated with the request, or the form or content of any responses from additional downstream services. The various conditions that may trigger the initiation of a trace may be promulgated to multiple services or updated at any suitable time. The various conditions may be implemented using a set of patterns that may be matched against elements of requests and/or responses. In one embodiment, a trace may also be initiated by a service (e.g., downstream service 650) as a result of probabilistic sampling techniques, such that the service initiates a trace for a certain percentage of inbound requests.

Once a trace has been initiated by the downstream service 650, responses or requests from the downstream service to other services may include an instruction for a recipient service to participate in the trace. In one embodiment, the instruction may be implemented using suitable metadata in a response or request. The metadata may be referred to as a trace header. Upon receipt of the trace header or other trace instruction by the one or more upstream services 645 and optional one or more additional downstream services 655, the recipient services may publish trace data. In one embodiment, the downstream service 650 that initiated the trace may also publish trace data. The trace data may describe the interactions between the services. The trace data publication functionality 620 may be used to generate and/or publish the trace data and to pass the trace data to a suitable recipient. Because the trace header or other trace instruction may be passed both upstream and downstream until the trace is terminated, additional downstream services 655 from one or more of the upstream services 645 may also take part in the trace. In one embodiment, the trace data reported by an upstream service may include connectivity information, timing information, and other suitable metadata regarding interactions between services. In one embodiment, the trace data reported by an upstream service may lack the latency information that a downstream service may be able to provide.

The trace may be terminated at any suitable point. In one embodiment, the trace may be terminated after a sufficient amount of time has passed with no new trace data being published. As described above, the timeout value applicable to terminating traces may vary according to the nature of the underlying transaction. Based on the trace data received from the various services, the call graph generation functionality 630 may build a call graph 635. The call graph 635 may be a hierarchical data structure representing individual services as nodes and call paths between services as edges. The call graph 635 may represent call paths and services involved over a period of time and/or to satisfy a particular request (e.g., a root request). As shown in the example of FIG. 6, the downstream service 650 that initiated the trace is indicated in the call graph 635 as a darkened node.

To monitor the service interactions and publish the resulting trace data, lightweight instrumentation may be added to the services 650, 645, and 655. The instrumentation (e.g., a reporting agent associated with each service) may collect and report data associated with each inbound request, outbound request, or other service interaction (e.g., a timer-based interaction) processed by a service. Further aspects of the service instrumentation, trace data publication functionality 620, and call graph generation functionality 630 are discussed below with respect to FIGS. 9-14.

Figure 7A:
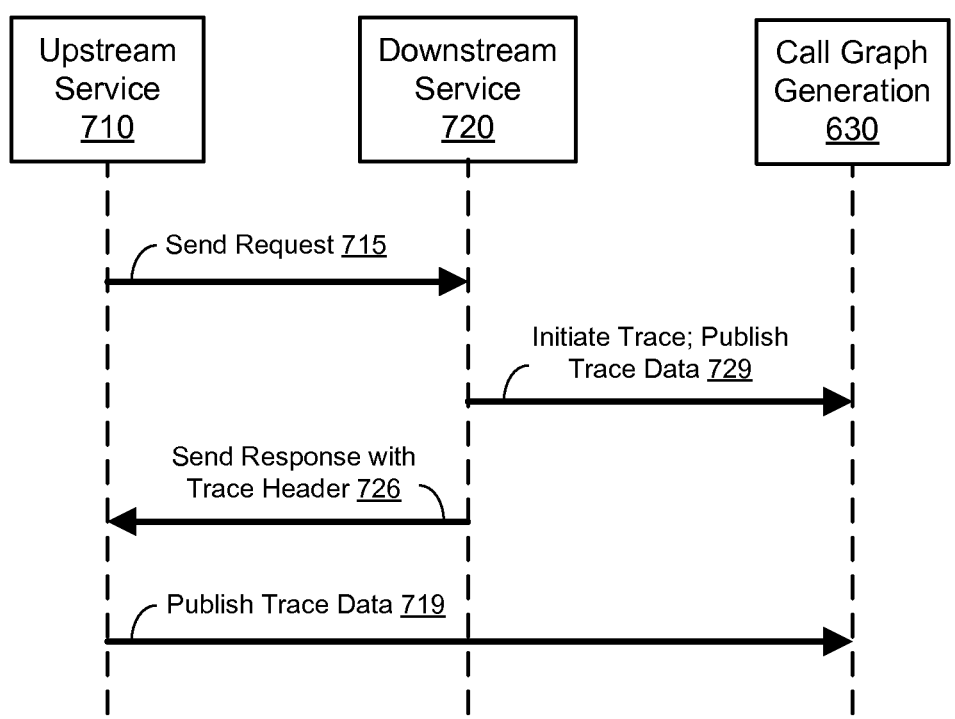
FIGS. 7A-7D are sequence diagrams illustrating examples of service interactions in trace backtracking, according to some embodiments.

FIGS. 7A-7D are sequence diagrams illustrating examples of service interactions in trace backtracking, according to some embodiments. As shown in the example of FIG. 7A, one service 710 may send a request 715 to another service 720. With respect to the request 715, service 710 is an upstream service and service 720 is a downstream service. In one embodiment, both the services 710 and 720 may include a trace initiation module that includes program logic for initiating a trace. As discussed above, any service may decide to initiate a trace if an error is encountered, if a particular condition is met, or if a probabilistic sampling technique triggers a trace. In the example of FIG. 7A, the downstream service 720 may initiate a trace based on a determination that at least one of the conditions for starting a trace has been met.

Figure 12:
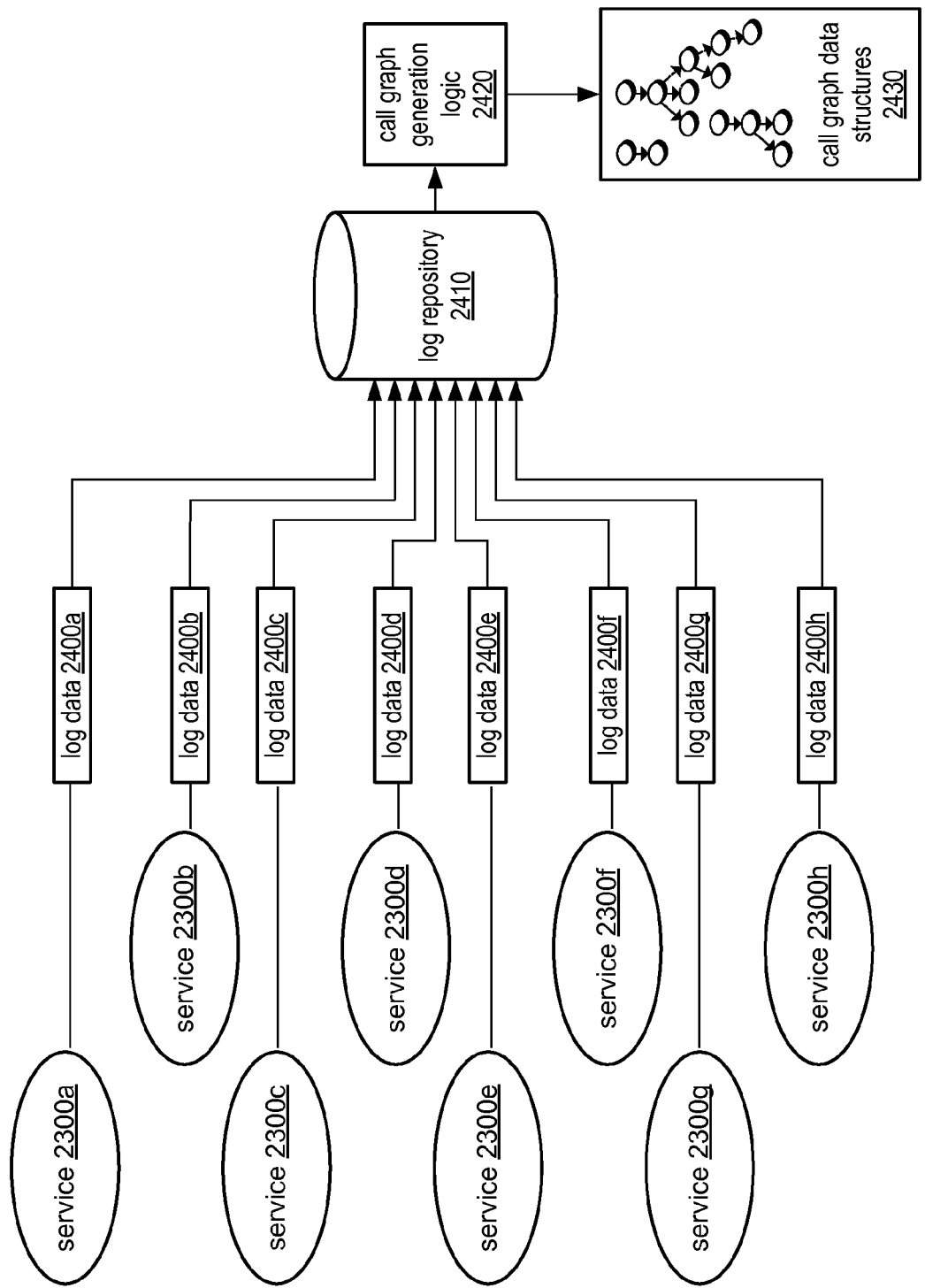
FIG. 12 illustrates an example data flow diagram for the collection of log data and generation of a call graph, according to some embodiments.

Each of the upstream service 710 and the downstream service 720 may also include a reporting agent. Each reporting agent may include program logic to monitor service interactions, generate trace data describing the interactions, and/or publish the trace data to the call graph generation functionality 630 or any other suitable recipient (e.g., log repository 2410 as shown in FIG. 12). As shown in FIG. 7A, the downstream service 720 may publish trace data 729 after initiating the trace. After initiating the trace, the downstream service 720 may send a response that includes a trace header 726 to the upstream service 710. In one embodiment, the downstream service 720 may send the response to the upstream service after the downstream service publishes trace data 729. Upon receiving the response with the trace header 726, the upstream service 710 may publish trace data 719. The trace data 719 and 729 may describe aspects of the interaction between the upstream service 710 and the downstream service 720. In one embodiment, the trace data 719 and 729 may be used to build a call graph 635 in which the services 710 and 720 are nodes and their interaction is an edge.

Figure 7B:
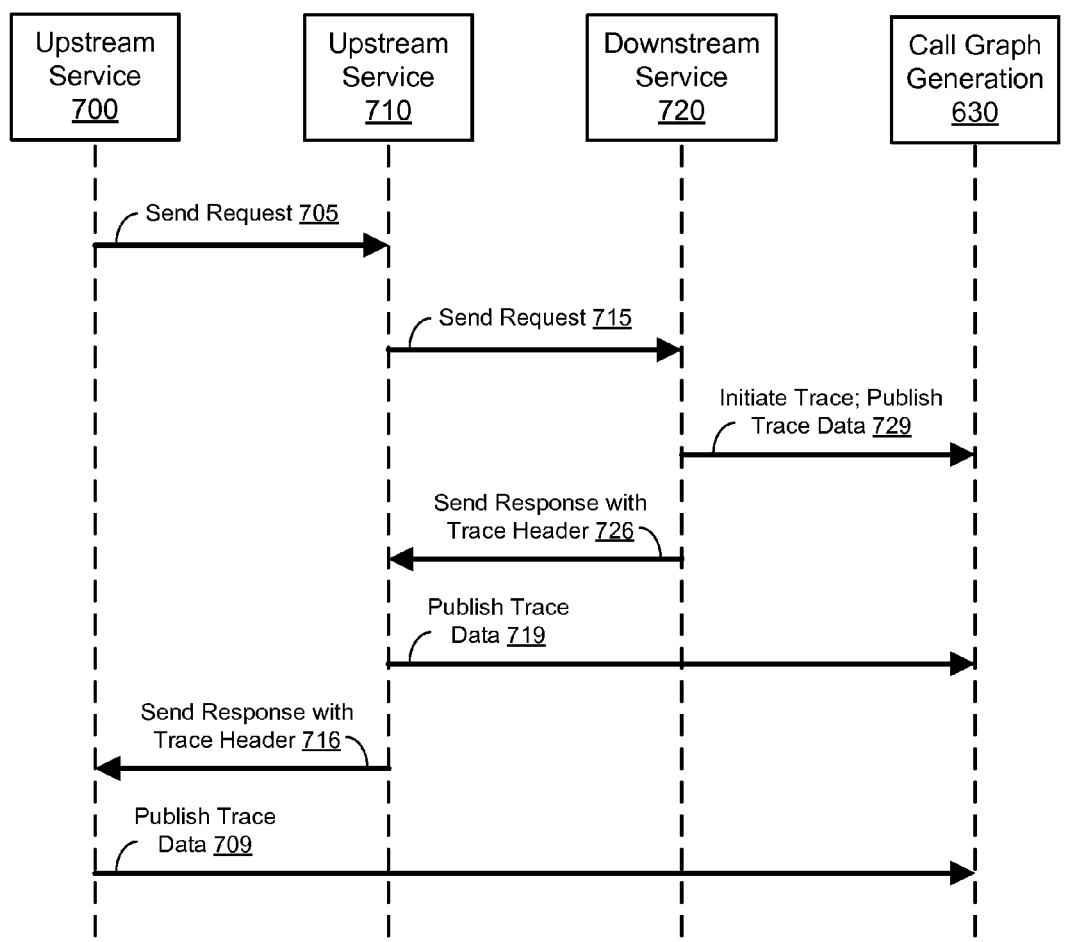

The trace may include one or more further upstream services. As shown in the example of FIG. 7B, one service 700 may send a request 705 to another service 710. The service 710 may then send another request 715 to a downstream service 720. The requests 705 and 715 may be associated with the same transaction flow. The sending of the request 715 may be performed to satisfy the earlier request. With respect to the downstream service 720, both the service 700 and the service 710 are upstream services. In the example of FIG. 7B, the downstream service 720 may initiate a trace based on a determination that at least one of the conditions for starting a trace has been met.

Each of the services 700, 710, and 720 may include a reporting agent. Each reporting agent may include program logic to monitor service interactions, generate trace data describing the interactions, and/or publish the trace data to the call graph generation functionality 630 or any other suitable recipient (e.g., log repository 2410 as shown in FIG. 12). As shown in FIG. 7B, the downstream service 720 may publish trace data 729 after initiating the trace. After initiating the trace, the downstream service 720 may send a response that includes a trace header 726 to the upstream service 710. In one embodiment, the downstream service

720 may send the response to the upstream service 710 after the downstream service 720 publishes trace data 729.

Upon receiving the response with the trace header 726 from the downstream service 720, the upstream service 710 may publish trace data 719. The upstream service 710 may also send a response including the trace header 716 to the further upstream service 700. In one embodiment, the upstream service 710 may send the response to the further upstream service 700 after the upstream service 710 publishes trace data 719. Upon receiving the response with the trace header 716, the further upstream service 700 may also publish trace data 709. The trace data 709, 719, and 729 may describe aspects of the interaction between the upstream service 710 and the further upstream service 700 and aspects of the interaction between the upstream service 710 and the downstream service 720. The trace data 709, 719, and 729 may be used to build a call graph 635 that includes three nodes representing the services 700, 710, 720 and two edges representing their interactions.

Figure 7C:
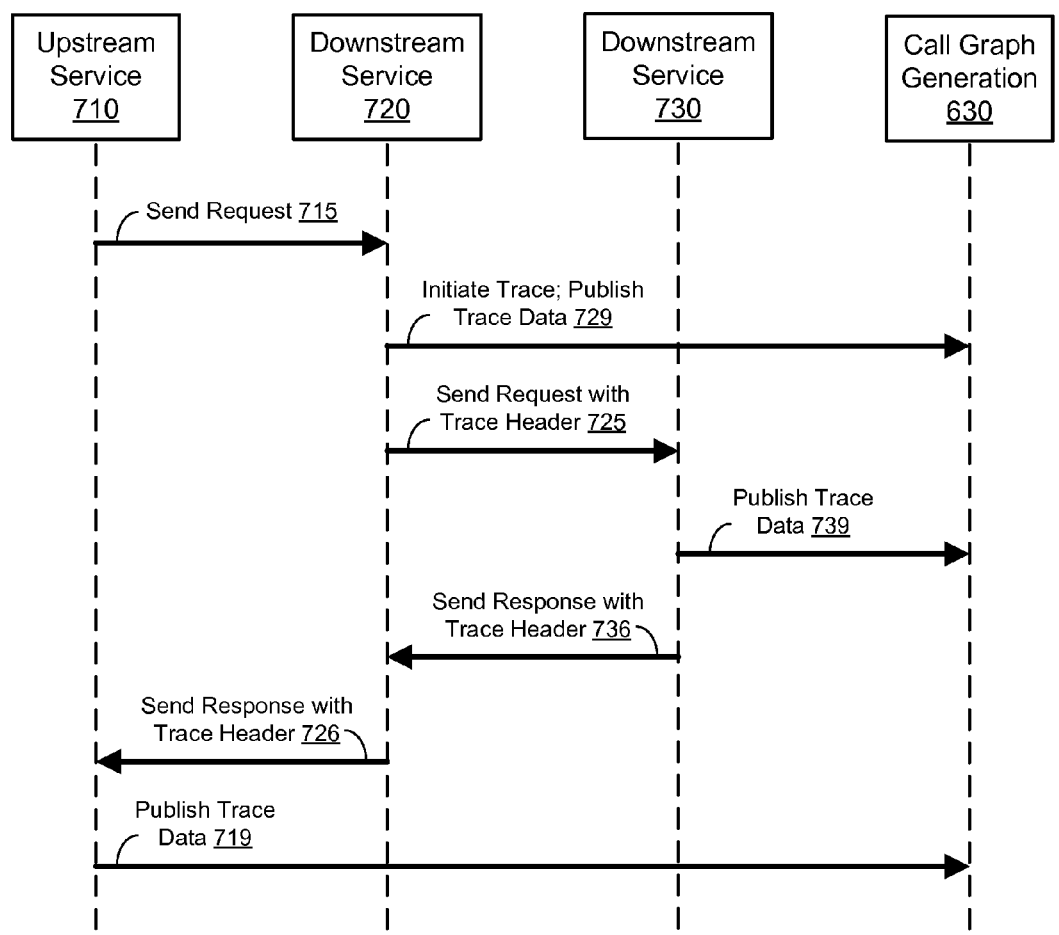

The trace may include one or more additional downstream services. As shown in the example of FIG. 7C, an upstream service 710 may send a request 715 to a downstream service 720. In the example of FIG. 7C, the downstream service 720 may initiate a trace based on a determination that at least one of the conditions for starting a trace has been met. Each of the services 710, 720, and 730 may include a reporting agent. Each reporting agent may include program logic to monitor service interactions, generate trace data describing the interactions, and/or publish the trace data to the call graph generation functionality 630 or any other suitable recipient (e.g., log repository 2410 as shown in FIG. 12). As shown in FIG. 7C, the downstream service 720 may publish trace data 729 after initiating the trace. After initiating the trace, the downstream service 720 may also send another request including a trace header 725 to an additional downstream service 730. The requests 715 and 725 may be associated with the same transaction flow, and the request with trace header 725 may be sent to satisfy the prior request 715. In one embodiment, the downstream service 720 may send the request to the additional downstream service 730 after the downstream service 720 publishes trace data 729.

As shown in FIG. 7C, the downstream service 730 may publish trace data 739 after receiving the request with the trace header 725. After completing or attempting to complete the requested operation, the additional downstream service 730 may send a response including the trace header 736 back to the downstream service 720. In one embodiment, the additional downstream service 730 may send the response to the downstream service 720 after the additional downstream service 730 publishes trace data 739.

After receiving the response from the additional downstream service 730, the downstream service 720 may send a response that includes the trace header 726 to the upstream service 710. Upon receiving the response with the trace header 726, the upstream service 710 may also publish trace data 719. The trace data 719, 729, and 739 may describe aspects of the interaction between the upstream service 710 and the downstream service 720 and aspects of the interaction between the downstream service 720 and the additional downstream service 730. The trace data 719, 729, and 739 may be used to build a call graph 635 that includes three nodes representing the services 710, 720, 730 and two edges representing their interactions.

Figure 7D:
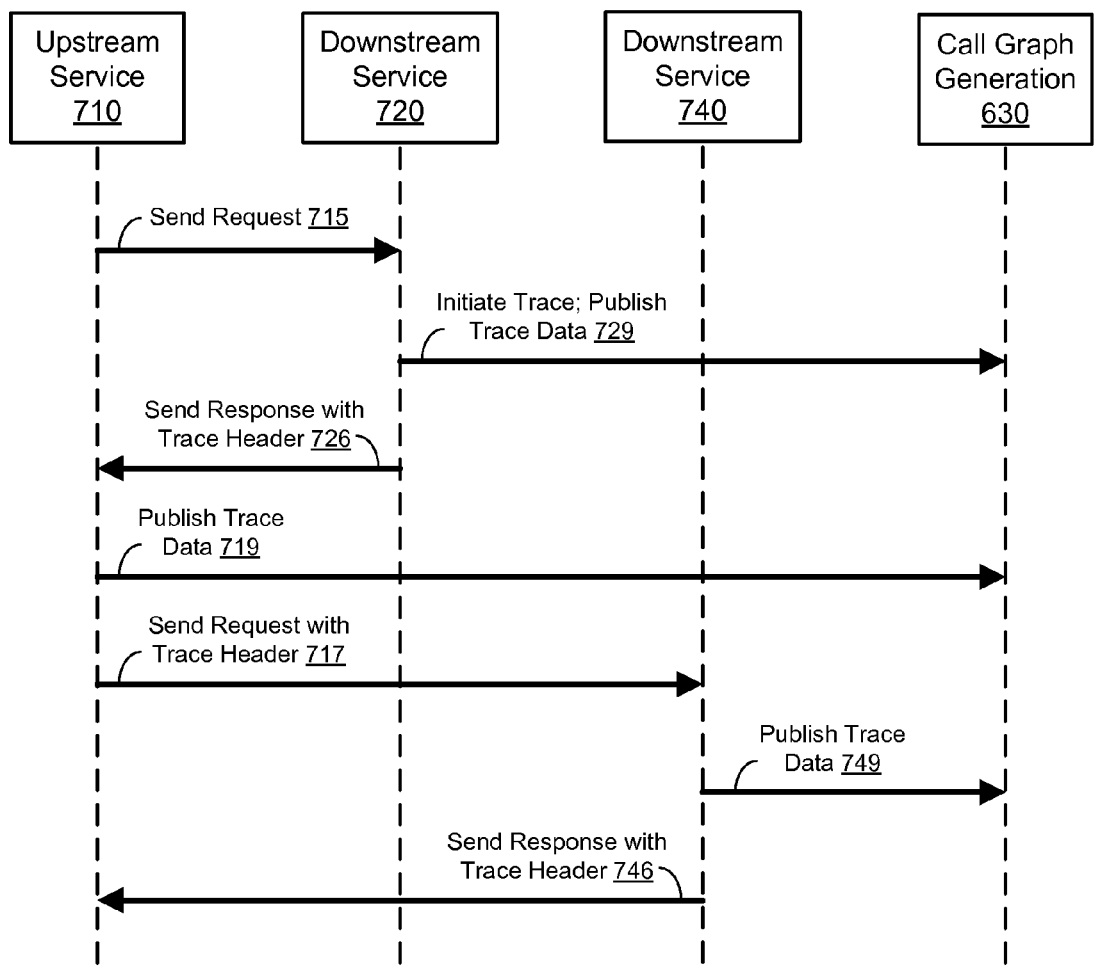

The trace may include one or more additional downstream services that are parallel to the downstream service that initiated the trace. As shown in the example of FIG. 7D, an upstream service 710 may send a request 715 to a downstream service 720. In the example of FIG. 7D, the downstream service 720 may initiate a trace based on a determination that at least one of the conditions for starting a trace has been met.

Each of the services 710, 720, and 740 may include a reporting agent. Each reporting agent may include program logic to monitor service interactions, generate trace data describing the interactions, and/or publish the trace data to the call graph generation functionality 630 or any other suitable recipient (e.g., log repository 2410 as shown in FIG. 12). As shown in FIG. 7D, the downstream service 720 may publish trace data 729 after initiating the trace. After initiating the trace, the downstream service 720 may also send a response that includes a trace header 726 to the upstream service 710. In one embodiment, the downstream service 720 may send the response to the upstream service 710 after the downstream service 720 publishes trace data 729.

Upon receiving the response with the trace header 726, the upstream service 710 may publish trace data 719. The upstream service 710 may also send another request 717 to an additional downstream service 740 after receiving the trace header from the downstream service 720. Because the trace has already been initiated, the upstream service 710 may include the trace header in the additional request 717. Because of the trace header, the additional downstream service 740 may publish trace data 749 upon receiving the additional request. After completing or attempting to complete the requested operation, the additional downstream service 740 may also send a response 746 to the upstream service. The response 746 may also include the trace header. In one embodiment, the additional downstream service 740 may send the response to the upstream service 710 after the additional downstream service 740 publishes trace data 749. The trace data 719, 729, and 749 may describe aspects of the interaction between the upstream service 710 and the downstream service 720 and aspects of the interaction between the upstream service 710 and the additional downstream service 740. The trace data 719, 729, and 749 may be used to build a call graph 635 that includes three nodes representing the services 710, 720, 740 and two edges representing their interactions.

Figure 8:
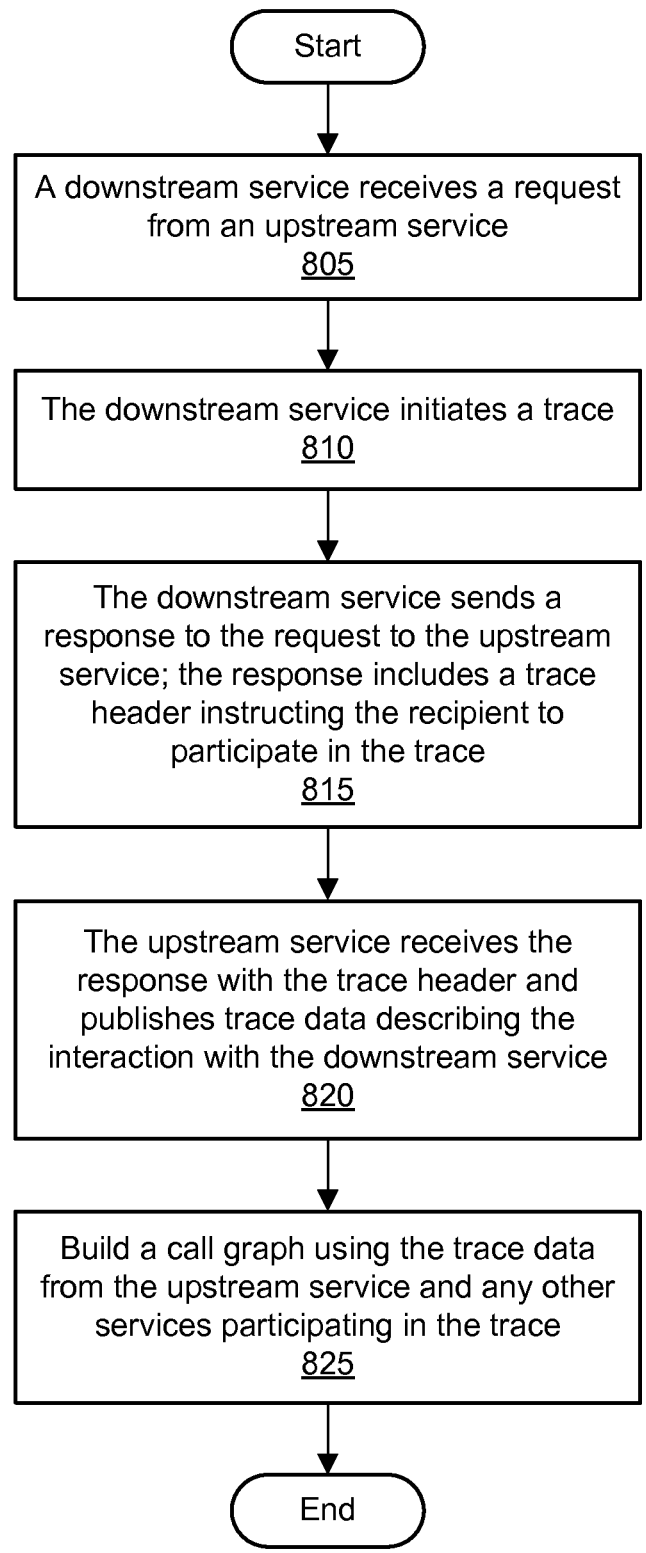
FIG. 8 is a flowchart illustrating a method for implementing trace backtracking, according to some embodiments.

FIG. 8 is a flowchart illustrating a method for implementing trace backtracking, according to some embodiments. The term "service" as used in FIG. 8 may refer to any service or component, such as a component within a service. As shown in 805, a downstream service may receive a request from an upstream service. As shown in 810, the downstream service may initiate a trace. A trace initiator within the downstream service may determine that the trace should be initiated based on one or more conditions being met.

As shown in 815, the downstream service may send a response to the request to the upstream service. The response may include a trace header or other trace metadata that instructs the recipient to participate in the trace. In one embodiment, the downstream service may also publish trace data after initiating the trace.

As shown in 820, the upstream service may receive the response with the trace header and begin generating and publishing trace data. The trace data may describe the interaction between the upstream service and the downstream service. The upstream service may send the trace data to a suitable recipient such as a log repository. As shown in 825, a call graph may be built using the trace data from the upstream service and from any other services participating in the trace (e.g., the downstream service, any additional upstream services, and/or any additional downstream services). The call graph may represent services as nodes and their interactions as edges.

Tracking Service Requests

Various embodiments of a system and method for tracking service requests may include a framework for tracking a series of requests that propagate through a service-oriented system, such as a system structured according to a service-oriented architecture (SOA). Such a system may include multiple services configured to communicate with each other (e.g., through message passing) to carry out various tasks, such as business process functions. In some embodiments, such services may be loosely coupled in order to minimize (or in some cases eliminate) interdependencies among services. This modularity may enable services to be reused in order to build various applications through a process referred to as orchestration.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services.

To process a given received request, the system described herein may invoke one or more of the types of services described above. As used herein, an initial request may be referred to as the "root request." In various embodiments, the root request may but need not originate from a computer system outside of the service-oriented system described herein. In many embodiments, a root request may be processed by an initial service, which may then call one or more other services. Additionally, each of those services may also call one or more other services, and so on until the root request is completely fulfilled. Accordingly, the particular services called to fulfill a request may be represented as a call graph that specifies, for each particular service of multiple services called to fulfill the same root request, the service that called the particular service and any services called by the particular service. For instance, a call graph may in some cases include a deep and broad tree with multiple branches each representing a series of related service calls.

For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

As described above, a given parent request may result in multiple child service calls to other services. In various embodiments of the system and method for tracking service requests, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 9:
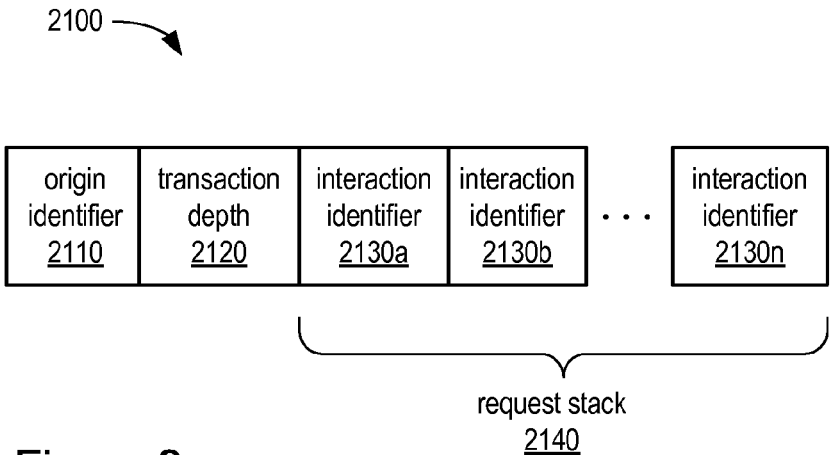
FIG. 9 illustrates an example format of a request identifier, according to some embodiments.

FIG. 9 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 9. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lowercase alphabetic characters in order to enable fast case-sensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130a-2130n, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130a, the call of service "C" by service "B" may be identified by interaction identifier 2130b and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of services requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the shear number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130$a$-2130$n$ may represent a series of interaction identifiers in ascending chronological order (where interaction identifier 2130$a$ corresponds to the oldest service call and interaction identifier 2130$n$ corresponds to the most recent service call).

In addition to the illustrated elements, request identifier 2100 may in various embodiments include one or more portions of data for error detection and/or error correction. Examples of such data include but are not limited to various types of checksums.

Figure 10:
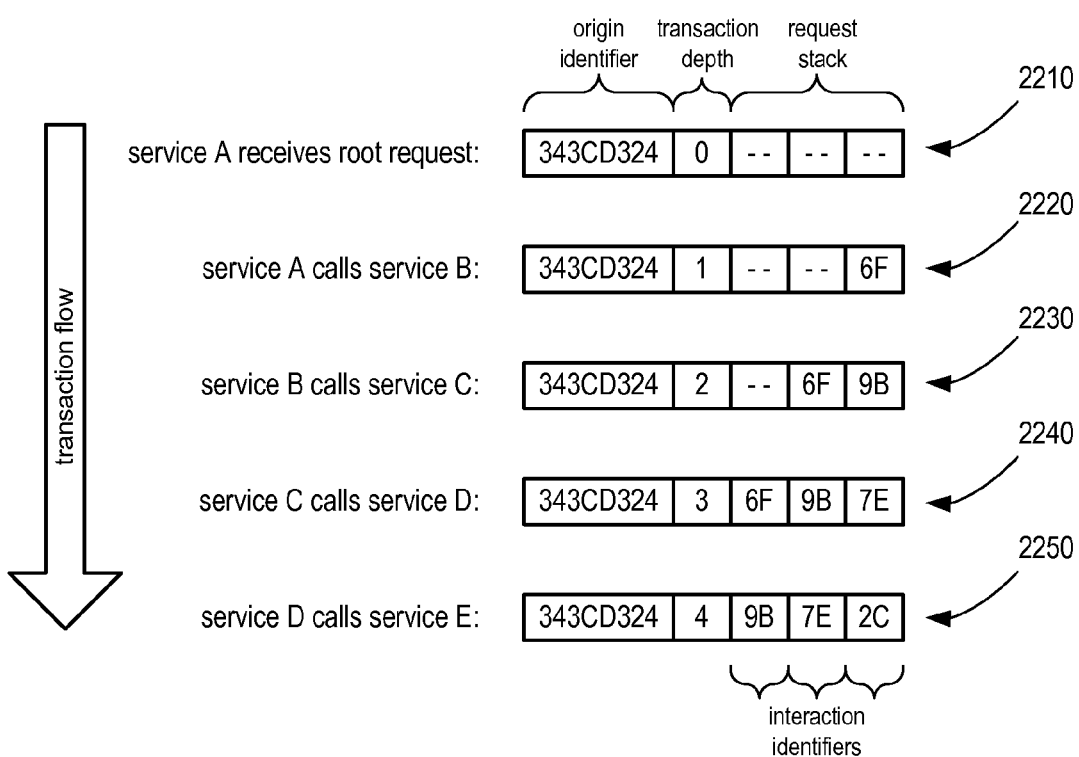
FIG. 10 illustrates an example transaction flow for fulfilling a root request, according to some embodiments.

FIG. 10 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 11). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 11:
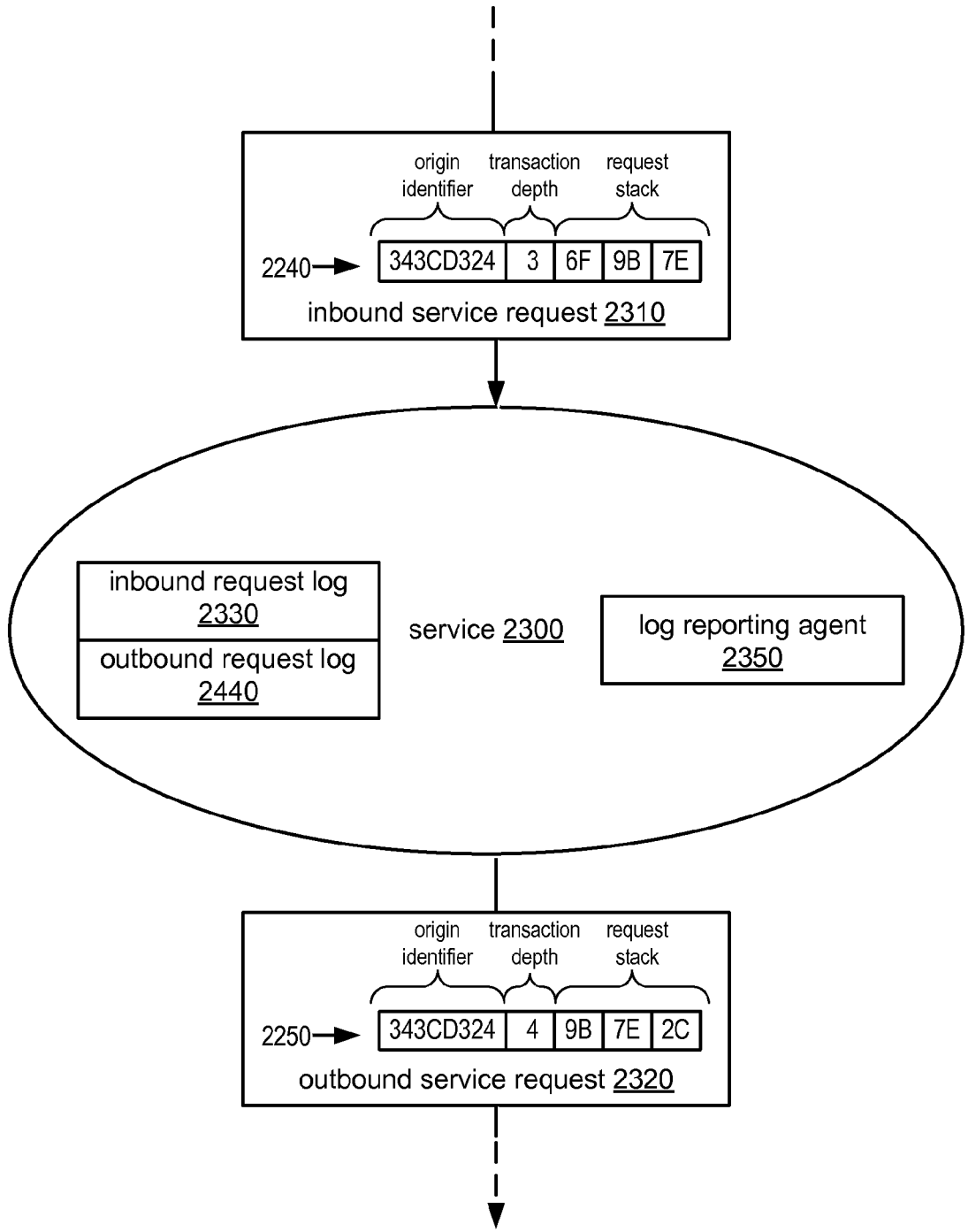
FIG. 11 illustrates one example of a service of a service-oriented system, according to some embodiments.

Referring collectively to FIG. 10 and FIG. 11, a representation of the receipt of an inbound service request (or service call) 2310 as well as the issuance of an outbound request 2320 by service 2300 is illustrated. Request identifiers 2240 and 2250 of FIG. 11 may correspond to the like-numbered elements of FIG. 10. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 10. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324." For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Referring collectively to FIG. 11 and FIG. 12, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 12. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 12, multiple services 2300*a*-2300*h* within the service-oriented system may be configured to transmit respective log data 2400*a*-2400*h* to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 13:
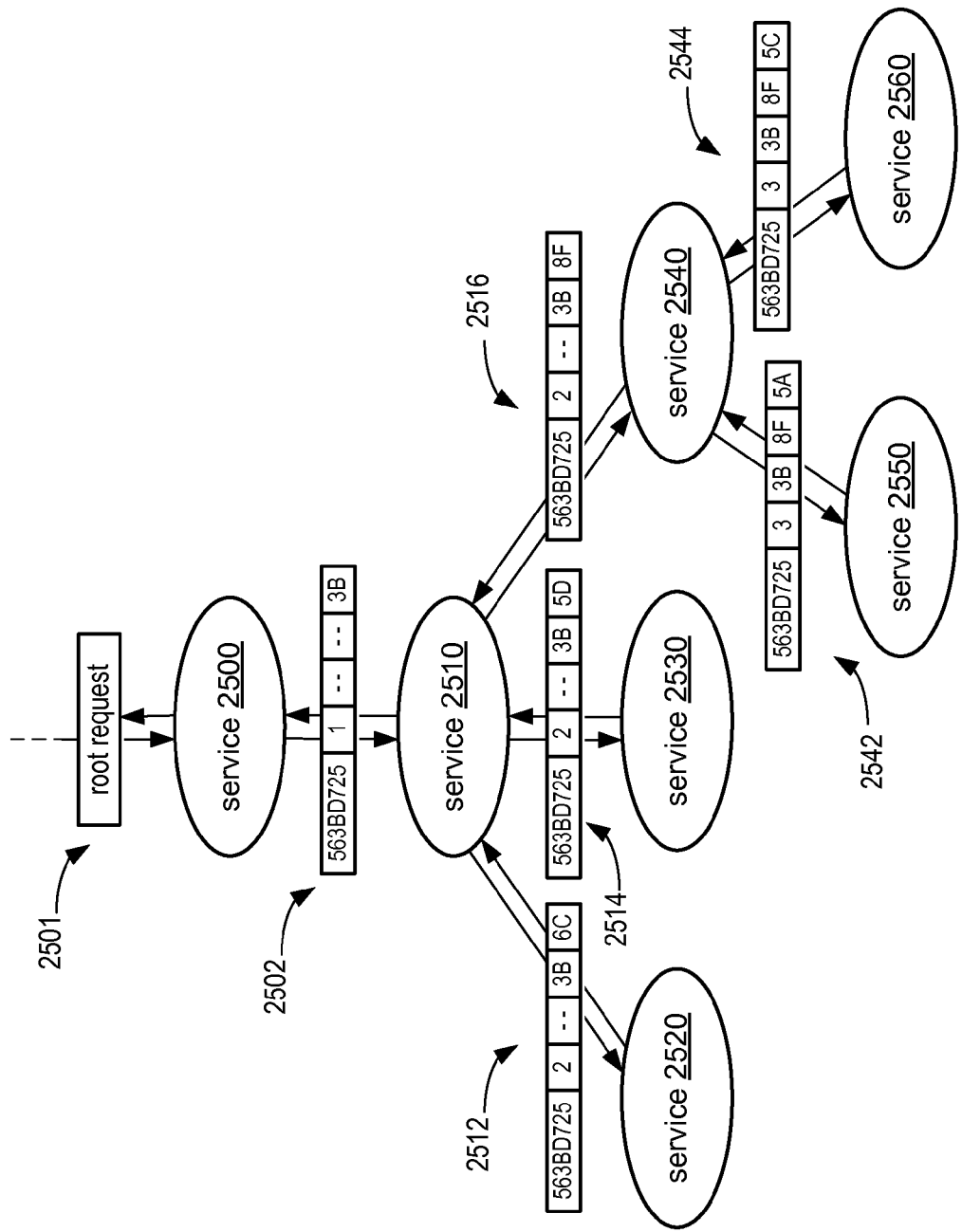
FIG. 13 illustrates an example visual representation of a call graph and request identifiers from which such call graph is generated, according to some embodiments.

FIG. 13 illustrates a visual representation of such a call graph data structure that may be generated by call graph generation logic 2420. In various embodiments, a call graph data structure may include any data structure that specifies, for a given root request, all the services called to fulfill that root request. Note that while FIG. 13 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410.

Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and 2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and service 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The system and method for tracking service requests described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 13 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 9. Generating the data structure may also include determining that the request stack of a given node at a given level within the hierarchy includes an interaction identifier that is the same as an interaction identifier of the request stack of another node located within an adjacent level of the hierarchy. For instance, the call graph generation logic may include any of the various interaction identifier comparison techniques described above with respect to FIGS. 8 and 9. In response to determining such match, the call graph generation logic may indicate a service call as an edge between said given node and said other node. Examples of such an edge are illustrated as the edges coupling the nodes of FIG. 13 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 11 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 11, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 11, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 11.

In various embodiments, the call graph generation logic may also generate the new depth value such that the new depth value is a result of incrementing the first depth value. For example, in the illustrated embodiment of FIG. 11, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 11, the inbound and outbound request identifiers may be stored in inbound request log 2330 and outbound request log 2340, respectively.

For each of the interactions between the services 2500, 2510, 2520, 2530, 2540, 2550, and 250, a request path or downstream path is shown. For each of the interactions between the services 2500, 2510, 2520, 2530, 2540, 2550, and 250, a reply path or upstream path is also shown. In response to each request, the recipient (i.e., downstream) service may send a reply to the requesting (i.e., upstream) service at any appropriate point in time, e.g., after completing the requested operation and receiving replies for any further downstream services called to satisfy the request. A downstream service that is a leaf in the relevant call graph (i.e., a service that calls no further services) may send a reply to the immediately upstream service upon completion of the requested operation or upon encountering an error that prevents completion of the requested operation. A reply may include any suitable data and/or metadata, such as the output of a requested service in the reply path and/or any error codes or condition codes experienced in the reply path. A reply may also include any suitable element(s) of identifying information from the request stack of the corresponding request, such as the origin identifier and/or interaction identifiers shown in FIG. 9.

Figure 14:
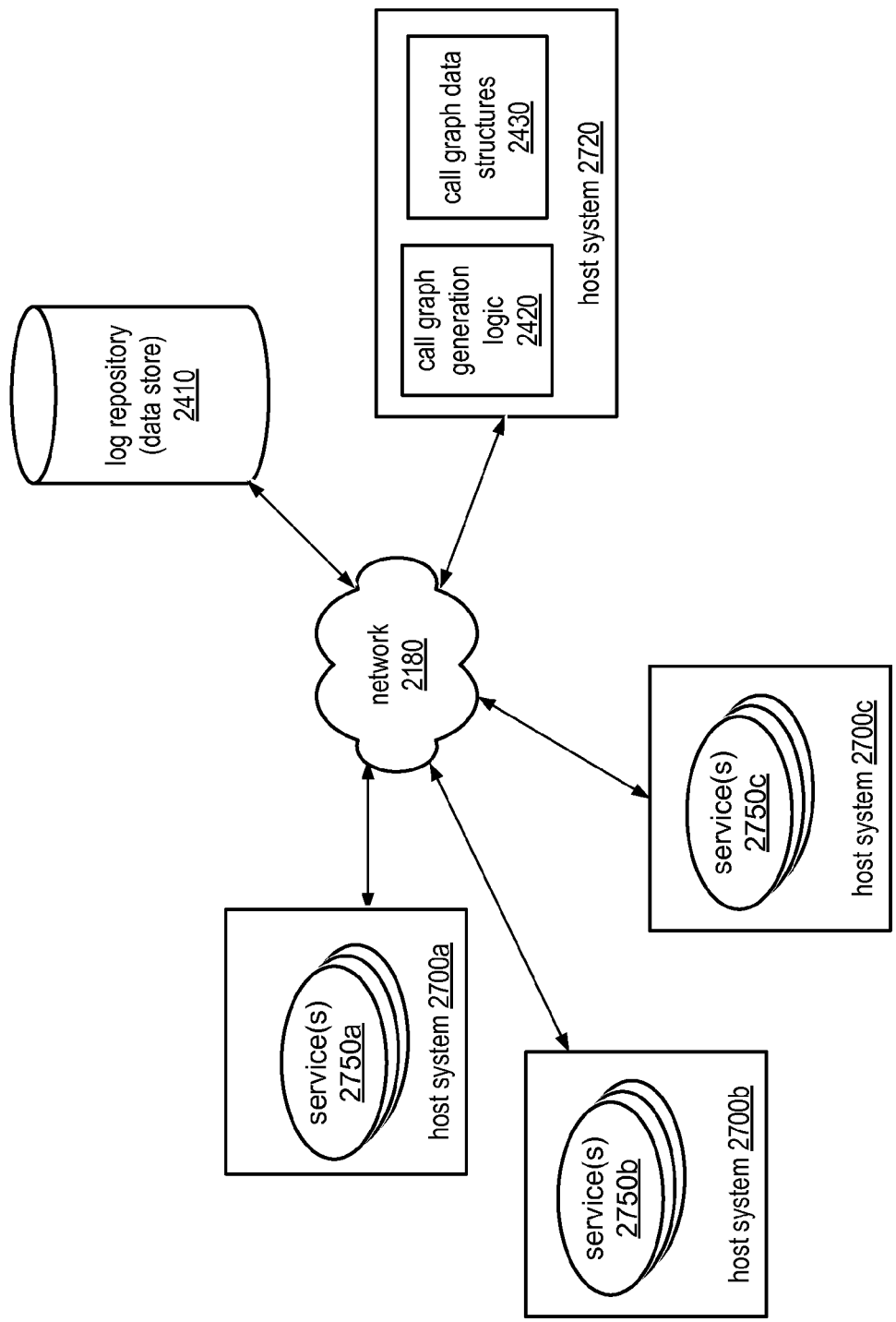
FIG. 14 illustrates an example system configuration for tracking service requests, according to some embodiments.

One example system configuration for tracking service requests is illustrated in FIG. 14. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700a-c and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700a may be configured to execute program instruction to implement one or more services 2750a. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700b-c and services 2750b-c may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Illustrative Computer System

In at least some embodiments, a computer system that implements a portion or all of one or more of the technologies described herein may include a general-purpose computer system that includes or is configured to access one or more computer-readable media. FIG. 15 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

Embodiments of the disclosure can be described in view of the following clauses:

Clause 1. A system, comprising:
one or more computing devices configured to implement a trace deduplication system, wherein the trace deduplication system is operable to:
determine one or more interactions between a plurality of services, wherein the one or more interactions relate to a trace of one or more service requests;
generate a fingerprint for the one or more interactions based on identifiers for the plurality of services;
perform a comparison between the fingerprint and a plurality of stored fingerprints, wherein each of the plurality of stored fingerprints represents a respective stored trace;
if the fingerprint does not match one of the stored fingerprints, store the fingerprint and data indicative of the trace, wherein the data indicative of the trace comprises data indicative of the one or more interactions between the plurality of services; and
if the fingerprint matches one of the stored fingerprints, discard the trace from memory and update one or more statistics for the stored trace corresponding to the matching stored fingerprint.

Clause 2. The system as recited in clause 1, wherein the trace deduplication system is operable to:
determine a second set of one or more interactions between a second plurality of services, wherein the second set of one or more interactions relate to a second trace;
generate a second fingerprint for the second set of one or more interactions based on identifiers for the second plurality of services;
perform a comparison between the second fingerprint and the plurality of stored fingerprints;
if the second fingerprint does not match one of the stored fingerprints, store the second fingerprint and data indicative of the second trace, wherein the data indicative of the second trace comprises data indicative of the second set of one or more interactions between the second plurality of services;
if the second fingerprint matches one of the stored fingerprints, and if the second trace does not match one of a plurality of patterns, discard the second trace and update one or more statistics for the stored trace corresponding to the stored fingerprint matching the second fingerprint; and if the second fingerprint matches one of the stored fingerprints, and if the second trace matches at least one of the plurality of patterns, store the second fingerprint and data indicative of the second trace.

Clause 3. The system as recited in clause 1 or 2, wherein, in determining the trace, the trace deduplication system is operable to:
  monitor the one or more interactions among the plurality of services, wherein the one or more interactions comprise one or more requests, one or more responses, or one or more requests and responses;
  assign the one or more interactions to the trace based on a trace identifier found in individual ones of the one or more requests, the one or more responses, or the one or more requests and responses; and
  finalize the trace after a predetermined amount of time has passed with no change in the trace.

Clause 4. The system as recited in any one of clauses 1 to 3, wherein the trace deduplication system is operable to:
  initiate the trace based on a probabilistic sampling of a plurality of traceable service requests in a distributed system.

Clause 5. A computer-implemented method, comprising:
  generating a fingerprint representing one or more interactions between a plurality of components, wherein the one or more interactions relate to a trace;
  comparing the fingerprint with a plurality of stored fingerprints representing a plurality of stored traces;
  determining that the trace is a duplicate if the fingerprint matches one of the plurality of stored fingerprints; and
  storing data indicative of the trace if the fingerprint does not match any of the plurality of stored fingerprints.

Clause 6. The method as recited in clause 5, further comprising:
  updating a latency statistic, a hit count, or both, for a matching stored trace if the fingerprint matches one of the plurality of stored fingerprints.

Clause 7. The method as recited in clause 5 or 6, wherein generating the fingerprint comprises:
  applying a hash function to an ordered list of service names for the plurality of components.

Clause 8. The method as recited in any one of clauses 5 to 7, further comprising:
  in response to determining that the trace is a duplicate, tagging the trace as duplicative; and
  discarding the trace from memory based on the tagging.

Clause 9. The method as recited in any one of clauses 5 to 8, further comprising:
  monitoring the one or more interactions between the plurality of components, wherein the one or more interactions comprise one or more requests, one or more responses, or one or more requests and responses;
  assigning the one or more interactions to the trace based on a trace identifier associated with individual ones of the one or more requests, the one or more responses, or the one or more requests and responses; and
  finalizing the trace after a predetermined amount of time has passed with no change in the trace.

Clause 10. The method as recited in any one of clauses 5 to 9, further comprising:
  initiating the trace based on a probabilistic sampling of a plurality of traceable service requests in a distributed system.

Clause 11. The method as recited in any one of clauses 5 to 10, wherein comparing the fingerprint with the plurality of stored fingerprints comprises determining whether the fingerprint is an exact match of one or more of the plurality of stored fingerprints, and wherein the data indicative of the trace is stored if the fingerprint is an exact match of one or more of the plurality of stored fingerprints.

Clause 12. The method as recited in any one of clauses 5 to 11, wherein comparing the fingerprint with the plurality of stored fingerprints comprises determining whether the fingerprint is similar to but not an exact match of one or more of the plurality of stored fingerprints, and wherein the data indicative of the trace is stored if the fingerprint is similar to but not an exact match of one or more of the plurality of stored fingerprints.

Clause 13. The method as recited in any one of clauses 5 to 12, wherein the fingerprint is generated using a first computer system, wherein the fingerprint is compared with the plurality of stored fingerprints using a second computer system, and wherein the method further comprises:
  generating a plurality of additional fingerprints using a third computer system; and
  comparing individual additional fingerprints with the plurality of stored fingerprints using the second computer system.

Clause 14. A computer-readable storage medium storing program instructions computer-executable to perform:
  determining a plurality of call paths among a plurality of components, wherein the plurality of call paths represent a route taken in satisfying a service request;
  comparing the route with a plurality of stored routes;
  if the route does not match any of the plurality of stored routes, adding the route to the plurality of stored routes; and
  if the route matches one of the plurality of stored routes, determining that the route is a duplicate and updating one or more statistics for the matching one of the plurality of stored routes.

Clause 15. The computer-readable storage medium as recited in clause 14, wherein the program instructions are computer-executable to perform:
  generating a fingerprint representing the route, wherein the fingerprint comprises a hash of an ordered list of the plurality of components;
  wherein comparing the route with the plurality of stored routes comprises comparing the fingerprint representing the route with a plurality of stored fingerprints representing the plurality of stored routes.

Clause 16. The computer-readable storage medium as recited in clause 14 or 15, wherein the one or more statistics comprise a latency statistic, a hit count, or both.

Clause 17. The computer-readable storage medium as recited in any one of clauses 14 to 16, further comprising:
  determining a second plurality of call paths among a second plurality of components, wherein the second plurality of call paths represent a second route taken in satisfying a second service request;
  comparing the second route with the plurality of stored routes;
  if the second route does not match any of the plurality of stored routes, adding the second route to the plurality of stored routes;
  if the second route matches one of the plurality of stored routes and does not satisfy one of a plurality of deduplication exceptions, determining that the second route is a duplicate and updating one or more statistics for the one of the plurality of stored routes matching the second route; and if the second route matches one of the plurality of stored routes and satisfies at least one of the plurality of deduplication exceptions, adding the second route to the plurality of stored routes.

Clause 18. A system, comprising:
at least one processor;
a memory coupled to the at least one processor, wherein the memory stores program instructions, wherein the program instructions are executable by the at least one processor to:
generate a hash value representing a plurality of call paths between a plurality of components in a route;
compare the hash value with a plurality of stored hash values representing a plurality of stored routes;
if the hash value does not match any of the plurality of stored hash values, add the route to the plurality of stored routes; and
if the hash value matches one of the plurality of stored hash values, discard the route and update one or more statistics for a matching one of the stored routes.

Clause 19. The system as recited in clause 18, wherein the one or more statistics comprise a latency statistic, a hit count, or both.

Clause 20. The system as recited in clause 18 or 19, wherein the route is determined based on a probabilistic sampling of a plurality of traceable service requests in a distributed system.

Clause 21. A system, comprising:
one or more computing devices configured to implement a trace backtracking system, wherein the trace backtracking system is operable to:
in response to receiving a request from an upstream service at a downstream service, initiate a trace;
send a response to the request from the downstream service to the upstream service, wherein the response comprises trace metadata, wherein the trace metadata represents an instruction for a recipient service to participate in the trace;
publish trace data from the upstream service in response to receiving the trace metadata at the upstream service; and
generate a call graph based on the trace data, wherein the call graph comprises a call path between the upstream service and the downstream service.

Clause 22. The system as recited in clause 21, wherein the trace backtracking system is operable to:
send a second response from the upstream service to a second upstream service, wherein the second response comprises the trace metadata;
publish second trace data from the second upstream service in response to receiving the trace metadata at the second upstream service; and
modify the call graph based on the second trace data, wherein the modified call graph comprises a second call path between the second upstream service and the upstream service.

Clause 23. The system as recited in clause 21 or 22, wherein the trace backtracking system is operable to:
send a second request from the downstream service to a second downstream service, wherein the second request comprises the trace metadata;

publish second trace data from the second downstream service in response to receiving the trace metadata at the second downstream service; and
modify the call graph based on the second trace data, wherein the modified call graph comprises a second call path between the downstream service and the second downstream service.

Clause 24. The system as recited in any one of clauses 21 to 23, wherein the trace backtracking system is operable to:
send a second request from the upstream service to a second downstream service, wherein the second request comprises the trace metadata received at the upstream service from the downstream service;
publish second trace data from the second downstream service in response to receiving the trace metadata at the second downstream service; and
modify the call graph based on the second trace data, wherein the modified call graph comprises a second call path between the upstream service and the second downstream service.

Clause 25. A computer-implemented method, comprising:
receiving a request from an upstream component at a downstream component;
sending a response to the request from the downstream component to the upstream component, wherein the response comprises trace metadata; and
generating trace data at the upstream component in response to receiving the trace metadata at the upstream component, wherein the trace data describes an interaction between the upstream component and the downstream component.

Clause 26. The method as recited in clause 25, further comprising:
generating a call graph based on the trace data, wherein the call graph comprises a call path between the upstream component and the downstream component.

Clause 27. The method as recited in clause 25 or 26, wherein the downstream component comprises a first agent, wherein the trace metadata is added to the response by the first agent, wherein the upstream component comprises a second agent, and wherein the trace data is published by the second agent.

Clause 28. The method as recited in any one of clauses 25 to 27, further comprising:
initiating a trace at the downstream component after receiving the request, wherein the trace is initiated in response to the downstream component determining that a condition has been met.

Clause 29. The method as recited in any one of clauses 25 to 28, further comprising:
initiating a trace at the downstream component after receiving the request, wherein the trace is initiated in response to the downstream component detecting an error.

Clause 30. The method as recited in any one of clauses 25 to 29, further comprising:
initiating a trace at the downstream component after receiving the request, wherein the trace is initiated based on probabilistic sampling.

Clause 31. The method as recited in any one of clauses 25 to 30, further comprising:
sending a second response from the upstream component to a second upstream component, wherein the second response comprises the trace metadata;
generating second trace data at the second upstream component in response to receiving the trace metadata at the second upstream component, wherein the second trace data describes an interaction between the second upstream component and the upstream component; and generating a call graph based on the trace data and the second trace data, wherein the call graph comprises a first call path between the upstream component and the downstream component and a second call path between the second upstream component and the upstream component.

Clause 32. The method as recited in any one of clauses 25 to 31, further comprising:

sending a second request from the downstream component to a second downstream component, wherein the second request comprises the trace metadata;

generating second trace data at the second downstream component in response to receiving the trace metadata at the second downstream component, wherein the second trace data describes an interaction between the downstream component and the second downstream component; and generating a call graph based on the trace data and the second trace data, wherein the call graph comprises a first call path between the upstream component and the downstream component and a second call path between the downstream component and the second downstream component.

Clause 33. The method as recited in claim any one of clauses 25 to 32, further comprising:

sending a second request from the upstream component to a second downstream component, wherein the second request comprises the trace metadata received at the upstream component from the downstream component;

generating second trace data at the second downstream component in response to receiving the trace metadata at the second downstream component, wherein the second trace data describes an interaction between the upstream component and the second downstream component; and generating a call graph based on the trace data and the second trace data, wherein the call graph comprises a first call path between the upstream component and the downstream component and a second call path between the upstream component and the second downstream component.

Clause 34. A computer-readable storage medium storing program instructions computer-executable to perform:

in response to receiving a request from an upstream component at a downstream component, initiating a trace based on a determination made at the downstream component;

causing a response to the request from the downstream component to be sent to the upstream component, wherein the response comprises an instruction to participate in the trace; and publishing trace data from the upstream component in response to receiving the instruction to participate in the trace, wherein the trace data describes an interaction between the upstream component and the downstream component.

Clause 35. The computer-readable storage medium as recited in clause 34, wherein the program instructions are computer-executable to perform:

generating a call graph based on the trace data, wherein the call graph comprises a call path between the upstream component and the downstream component.

Clause 36. The computer-readable storage medium as recited in clause 34 or 35, wherein the program instructions are computer-executable to perform:

sending a second response from the upstream component to a second upstream component, wherein the second response comprises the instruction to participate in the trace;

publishing second trace data from the second upstream component in response to receiving the instruction to participate in the trace, wherein the second trace data describes an interaction between the second upstream component and the upstream component; and generating a call graph based on the trace data and the second trace data, wherein the call graph comprises a first call path between the upstream component and the downstream component and a second call path between the second upstream component and the upstream component.

Clause 37. The computer-readable storage medium as recited in any one of clauses 34 to 36, wherein the program instructions are computer-executable to perform:

sending a second request from the downstream component to a second downstream component, wherein the second request comprises the instruction to participate in the trace;

publishing second trace data from the second downstream component in response to receiving the instruction to participate in the trace, wherein the second trace data describes an interaction between the downstream component and the second downstream component; and generating a call graph based on the trace data and the second trace data, wherein the call graph comprises a first call path between the upstream component and the downstream component and a second call path between the downstream component and the second downstream component.

Clause 38. The computer-readable storage medium as recited in any one of clauses 34 to 37, wherein the program instructions are computer-executable to perform:

sending a second request from the upstream component to a second downstream component, wherein the second request comprises the instruction to participate in the trace received at the upstream component from the downstream component;

publishing second trace data from the second downstream component in response to receiving the instruction to participate in the trace, wherein the second trace data describes an interaction between the upstream component and the second downstream component; and generating a call graph based on the trace data and the second trace data, wherein the call graph comprises a first call path between the upstream component and the downstream component and a second call path between the upstream component and the second downstream component.

Clause 39. A system, comprising:

at least one processor;

a memory coupled to the at least one processor, wherein the memory stores program instructions, wherein the program instructions are executable by the at least one processor to:

in response to receiving a request from a first component at a second component, initiate a trace at the second component;

send a response to the request from the second component to the first component, wherein the response comprises a trace header; and generate trace data at the first component in response to receiving the trace header, wherein the trace data describes an interaction between the first component and the second component.

generate a call graph based on the trace data, wherein the call graph comprises a call path between the first component and the second component.

Clause 40. The system as recited in clause 39, wherein the program instructions are further executable by the at least one processor to:

send a second response from the first component to a third component, wherein the second response comprises the trace header;

generate second trace data at the third component in response to receiving the trace header, wherein the second trace data describes an interaction between the third component and the first component; and modify the call graph based on the second trace data, wherein the modified call graph comprises a second call path between the third component and the first component.

Clause 41. The system as recited in clause 39 or 40, wherein the program instructions are further executable by the at least one processor to:

send a second request from the second component to a third component, wherein the second request comprises the trace header;

generate second trace data at the third component in response to receiving the trace header, wherein the second trace data describes an interaction between the second component and the third component; and modify the call graph based on the second trace data, wherein the modified call graph comprises a second call path between the second component and the third component.

Clause 42. The system as recited in any one of clauses 39 to 41, wherein the program instructions are further executable by the at least one processor to:

send a second request from the first component to a third component, wherein the second request comprises the trace header received at the first component from the second component;

generate second trace data at the third component in response to receiving the trace header, wherein the second trace data describes an interaction between the first component and the third component; and modify the call graph based on the second trace data, wherein the modified call graph comprises a second call path between the first component and the third component.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a trace backtracking system, wherein the trace backtracking system is configured to:
in response to receiving a request from an upstream service at a downstream service, wherein the request is sent by the upstream service in response to an external request received by the system from another system for one or more services to be performed, initiate a trace, wherein the requested one or more services to be performed differ from the trace;
send a response to the request from the downstream service to the upstream service, wherein the response comprises trace metadata, wherein the trace metadata represents an instruction for a recipient service to participate in the trace;
publish trace data from the upstream service in response to receiving the trace metadata at the upstream service with the response from the downstream service; and
generate a call graph based on the trace data, wherein the call graph comprises a call path between the upstream service and the downstream service.

2. The system as recited in claim 1, wherein the trace backtracking system is configured to:
send a second response from the upstream service to a second upstream service, wherein the second response comprises the trace metadata;
publish second trace data from the second upstream service in response to receiving the trace metadata at the second upstream service; and
modify the call graph based on the second trace data, wherein the modified call graph comprises a second call path between the second upstream service and the upstream service.

3. The system as recited in claim 1, wherein the trace backtracking system is configured to:

send a second request from the downstream service to a second downstream service, wherein the second request comprises the trace metadata;
publish second trace data from the second downstream service in response to receiving the trace metadata at the second downstream service; and
modify the call graph based on the second trace data, wherein the modified call graph comprises a second call path between the downstream service and the second downstream service.

4. The system as recited in claim 1, wherein the trace backtracking system is configured to:
send a second request from the upstream service to a second downstream service, wherein the second request comprises the trace metadata received at the upstream service from the downstream service;
publish second trace data from the second downstream service in response to receiving the trace metadata at the second downstream service; and
modify the call graph based on the second trace data, wherein the modified call graph comprises a second call path between the upstream service and the second downstream service.

5. A computer-implemented method, comprising:
receiving a request from an upstream component at a downstream component, wherein the request is sent by the upstream component in response to an external request received from an external source for one or more services to be performed, wherein the requested one or more services to be performed differ from a trace;
sending a response to the request from the downstream component to the upstream component, wherein the response comprises trace metadata; and
generating trace data at the upstream component in response to receiving the trace metadata at the upstream component with the response from the downstream component, wherein the trace data describes an interaction between the upstream component and the downstream component.

6. The method as recited in claim 5, further comprising:
generating a call graph based on the trace data, wherein the call graph comprises a call path between the upstream component and the downstream component.

7. The method as recited in claim 5, wherein the downstream component comprises a first agent, wherein the trace metadata is added to the response by the first agent, wherein the upstream component comprises a second agent, and wherein the trace data is published by the second agent.

8. The method as recited in claim 5, further comprising:
initiating a trace at the downstream component after receiving the request, wherein the trace is initiated in response to the downstream component determining that a condition has been met.

9. The method as recited in claim 5, further comprising:
initiating a trace at the downstream component after receiving the request, wherein the trace is initiated in response to the downstream component detecting an error.

10. The method as recited in claim 5, further comprising:
initiating a trace at the downstream component after receiving the request, wherein the trace is initiated based on probabilistic sampling.

11. The method as recited in claim 5, further comprising:
sending a second response from the upstream component to a second upstream component, wherein the second response comprises the trace metadata;
generating second trace data at the second upstream component in response to receiving the trace metadata at the second upstream component, wherein the second trace data describes an interaction between the second upstream component and the upstream component; and
generating a call graph based on the trace data and the second trace data, wherein the call graph comprises a first call path between the upstream component and the downstream component and a second call path between the second upstream component and the upstream component.

12. The method as recited in claim 5, further comprising:
sending a second request from the downstream component to a second downstream component, wherein the second request comprises the trace metadata;
generating second trace data at the second downstream component in response to receiving the trace metadata at the second downstream component, wherein the second trace data describes an interaction between the downstream component and the second downstream component; and
generating a call graph based on the trace data and the second trace data, wherein the call graph comprises a first call path between the upstream component and the downstream component and a second call path between the downstream component and the second downstream component.

13. The method as recited in claim 5, further comprising:
sending a second request from the upstream component to a second downstream component, wherein the second request comprises the trace metadata received at the upstream component from the downstream component;
generating second trace data at the second downstream component in response to receiving the trace metadata at the second downstream component, wherein the second trace data describes an interaction between the upstream component and the second downstream component; and
generating a call graph based on the trace data and the second trace data, wherein the call graph comprises a first call path between the upstream component and the downstream component and a second call path between the upstream component and the second downstream component.

14. A non-transitory computer-readable storage medium storing program instructions computer-executable to perform:
in response to receiving a request from an upstream component at a downstream component, wherein the request is sent by the upstream component in response to an external request for one or more services to be performed, the external request received from a source that is external to a computer that is to execute the program instructions, initiating a trace based on a determination made at the downstream component, wherein the requested one or more services to be performed differ from the trace;
causing a response to the request from the downstream component to be sent to the upstream component, wherein the response comprises an instruction to participate in the trace; and
publishing trace data from the upstream component in response to receiving the instruction to participate in the trace with the response from the downstream service, wherein the trace data describes an interaction between the upstream component and the downstream component.

15. The non-transitory computer-readable storage medium as recited in claim 14, wherein the program instructions are computer-executable to perform:

generating a call graph based on the trace data, wherein the call graph comprises a call path between the upstream component and the downstream component.

16. The non-transitory computer-readable storage medium as recited in claim 14, wherein the program instructions are computer-executable to perform:

sending a second response from the upstream component to a second upstream component, wherein the second response comprises the instruction to participate in the trace;

publishing second trace data from the second upstream component in response to receiving the instruction to participate in the trace, wherein the second trace data describes an interaction between the second upstream component and the upstream component; and generating a call graph based on the trace data and the second trace data, wherein the call graph comprises a first call path between the upstream component and the downstream component and a second call path between the second upstream component and the upstream component.

17. The non-transitory computer-readable storage medium as recited in claim 14, wherein the program instructions are computer-executable to perform:

sending a second request from the downstream component to a second downstream component, wherein the second request comprises the instruction to participate in the trace;

publishing second trace data from the second downstream component in response to receiving the instruction to participate in the trace, wherein the second trace data describes an interaction between the downstream component and the second downstream component; and generating a call graph based on the trace data and the second trace data, wherein the call graph comprises a first call path between the upstream component and the downstream component and a second call path between the downstream component and the second downstream component.

18. The non-transitory computer-readable storage medium as recited in claim 14, wherein the program instructions are computer-executable to perform:

sending a second request from the upstream component to a second downstream component, wherein the second request comprises the instruction to participate in the trace received at the upstream component from the downstream component;

publishing second trace data from the second downstream component in response to receiving the instruction to participate in the trace, wherein the second trace data describes an interaction between the upstream component and the second downstream component; and generating a call graph based on the trace data and the second trace data, wherein the call graph comprises a first call path between the upstream component and the downstream component and a second call path between the upstream component and the second downstream component.

19. A system, comprising:
at least one processor;
a memory coupled to the at least one processor, wherein the memory stores program instructions, wherein the program instructions are executable by the at least one processor to:
in response to receiving a request from a first component at a second component, wherein the request is sent by the first component in response to an external request received by the system from another system for one or more services to be performed, initiate a trace at the second component, wherein the requested one or more services to be performed differ from the trace;
send a response to the request from the second component to the first component, wherein the response comprises a trace header;
generate trace data at the first component in response to receiving the trace header, wherein the trace data describes an interaction between the first component and the second component; and
generate a call graph based on the trace data, wherein the call graph comprises a call path between the first component and the second component.

20. The system as recited in claim 19, wherein the program instructions are further executable by the at least one processor to:
send a second response from the first component to a third component, wherein the second response comprises the trace header;
generate second trace data at the third component in response to receiving the trace header, wherein the second trace data describes an interaction between the third component and the first component; and
modify the call graph based on the second trace data, wherein the modified call graph comprises a second call path between the third component and the first component.

21. The system as recited in claim 19, wherein the program instructions are further executable by the at least one processor to:
send a second request from the second component to a third component, wherein the second request comprises the trace header;
generate second trace data at the third component in response to receiving the trace header, wherein the second trace data describes an interaction between the second component and the third component; and
modify the call graph based on the second trace data, wherein the modified call graph comprises a second call path between the second component and the third component.

22. The system as recited in claim 19, wherein the program instructions are further executable by the at least one processor to:
send a second request from the first component to a third component, wherein the second request comprises the trace header received at the first component from the second component;
generate second trace data at the third component in response to receiving the trace header, wherein the second trace data describes an interaction between the first component and the third component; and
modify the call graph based on the second trace data, wherein the modified call graph comprises a second call path between the first component and the third component.

* * * * *